(12) United States Patent
Colavito et al.

(10) Patent No.: US 10,797,498 B2
(45) Date of Patent: *Oct. 6, 2020

(54) POWER CAPACITY INDICATOR

(71) Applicant: Hand Held Products, Inc., Fort Mill, SC (US)

(72) Inventors: Stephen J. Colavito, Garnet Valley, PA (US); Ka Man Au, Philadelphia, PA (US); Christopher Allen, East Windsor, NJ (US); Larry Ramsey-Macomber, Fairport, NY (US)

(73) Assignee: HAND HELD PRODUCTS, INC., Fort Mill, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/288,915

(22) Filed: Feb. 28, 2019

(65) Prior Publication Data

US 2019/0207400 A1 Jul. 4, 2019

Related U.S. Application Data

(63) Continuation of application No. 15/870,010, filed on Jan. 12, 2018, now Pat. No. 10,263,443.

(Continued)

(51) Int. Cl.
*G08B 5/22* (2006.01)
*H02J 7/00* (2006.01)
(Continued)

(52) U.S. Cl.
CPC .......... *H02J 7/0047* (2013.01); *G08B 21/182* (2013.01); *H02J 7/0027* (2013.01); *H02J 7/0048* (2020.01); *H02J 50/10* (2016.02)

(58) Field of Classification Search
CPC ......... G06F 1/28; G06F 3/0202; H04L 45/00; H04W 52/0219; H04W 52/0277;
(Continued)

(56) References Cited

U.S. PATENT DOCUMENTS 5,590,343 A 12/1996 Bolan et al.
6,832,725 B2 12/2004 Gardiner et al.
(Continued)

FOREIGN PATENT DOCUMENTS

AU 2005211521 A1 3/2006
WO 2013/163789 A1 11/2013

OTHER PUBLICATIONS

Non-Final Rejection dated Jun 22, 2018 for U.S. Appl. No. 15/870,010.
(Continued)

*Primary Examiner* — Daniel Previl
(74) *Attorney, Agent, or Firm* — Alston & Bird LLP

(57) ABSTRACT

A wireless electronic device is provided which comprises a rechargeable power supply and a power capacity indicator unit. The power capacity indicator unit comprises one or more sensors configured to detect that the wireless electronic device is out of a base charger and is in an idle state for a predetermined idle threshold. The one or more sensors are further configured to detect when a power level of the rechargeable power supply is within at least one predetermined power threshold range. The control unit is configured to activate at least one power status indicator corresponding to the at least one predetermined power threshold range when the wireless electronic device is detected to be out of the base charger and in the idle state for the predetermined idle threshold, and the detection of the power level of the rechargeable power supply is within at least one predetermined power threshold range.

20 Claims, 12 Drawing Sheets

Related U.S. Application Data

(60) Provisional application No. 62/445,811, filed on Jan. 13, 2017.

(51) Int. Cl.
  *G08B 21/18* (2006.01)
  *H02J 50/10* (2016.01)

(58) Field of Classification Search
  CPC . H04W 84/18; H04W 84/20; H04W 52/0216; Y02D 70/142; Y02D 70/144; Y02D 70/22; Y02D 70/23; G01R 19/165; G01R 21/133; G01R 31/021; G01R 31/374; G01R 31/382; G01R 31/3828; G01R 31/392; G01R 31/3647; G01R 31/3835; H02H 5/04; H02J 2007/005; H02J 7/0047; H02J 50/10; H02J 7/0027; H02J 50/12; H02J 50/40; H02J 50/80; H02J 7/00; H02J 7/0004; H02J 7/007; H02J 7/0072; H02J 7/025; H02J 7/041; H02J 3/383; H02J 7/0077; H02J 7/35; G08B 21/182; A61M 2005/14208; A61M 2202/18; A61M 2202/332; A61M 2205/50; A61M 2205/502; A61M 2205/505; A61M 2205/52; A61M 2205/8206; A61M 2205/8212; A61M 2205/823; A61M 5/142; A61M 5/14228; A61M 5/14244; H01M 10/482; H01M 10/488; H02S 50/00
  USPC ...... 340/286.07, 636.1, 635, 636.12–636.13, 340/636.17, 636.19, 636.2, 660, 693.1, 340/693.2, 693.3, 693.4, 693.7, 10.34
  See application file for complete search history.

(56) References Cited

U.S. PATENT DOCUMENTS

| | | | |
|---|---|---|---|
| 7,128,266 B2 | 10/2006 | Zhu et al. |
| 7,159,783 B2 | 1/2007 | Walczyk et al. |
| 7,413,127 B2 | 8/2008 | Ehrhart et al. |
| 7,639,019 B2 | 12/2009 | Bosse et al. |
| 7,726,575 B2 | 6/2010 | Wang et al. |
| 8,044,815 B2 | 10/2011 | Du et al. |
| 8,294,969 B2 | 10/2012 | Plesko |
| 8,317,105 B2 | 11/2012 | Kotlarsky et al. |
| 8,322,622 B2 | 12/2012 | Liu |
| 8,366,005 B2 | 2/2013 | Kotlarsky et al. |
| 8,371,507 B2 | 2/2013 | Haggerty et al. |
| 8,376,233 B2 | 2/2013 | Horn et al. |
| 8,381,979 B2 | 2/2013 | Franz |
| 8,390,909 B2 | 3/2013 | Plesko |
| 8,408,464 B2 | 4/2013 | Zhu et al. |
| 8,408,468 B2 | 4/2013 | Van et al. |
| 8,408,469 B2 | 4/2013 | Good |
| 8,424,768 B2 | 4/2013 | Rueblinger et al. |
| 8,448,863 B2 | 5/2013 | Xian et al. |
| 8,457,013 B2 | 6/2013 | Essinger et al. |
| 8,459,557 B2 | 6/2013 | Havens et al. |
| 8,469,272 B2 | 6/2013 | Kearney |
| 8,474,712 B2 | 7/2013 | Kearney et al. |
| 8,479,992 B2 | 7/2013 | Kotlarsky et al. |
| 8,490,877 B2 | 7/2013 | Kearney |
| 8,517,271 B2 | 8/2013 | Kotlarsky et al. |
| 8,523,076 B2 | 9/2013 | Good |
| 8,528,818 B2 | 9/2013 | Ehrhart et al. |
| 8,544,737 B2 | 10/2013 | Gomez et al. |
| 8,548,420 B2 | 10/2013 | Grunow et al. |
| 8,550,335 B2 | 10/2013 | Samek et al. |
| 8,550,354 B2 | 10/2013 | Gannon et al. |
| 8,550,357 B2 | 10/2013 | Kearney |
| 8,556,174 B2 | 10/2013 | Kosecki et al. |
| 8,556,176 B2 | 10/2013 | Van et al. |
| 8,556,177 B2 | 10/2013 | Hussey et al. |
| 8,559,767 B2 | 10/2013 | Barber et al. |
| 8,561,895 B2 | 10/2013 | Gomez et al. |
| 8,561,903 B2 | 10/2013 | Sauerwein, Jr. |
| 8,561,905 B2 | 10/2013 | Edmonds et al. |
| 8,565,107 B2 | 10/2013 | Pease et al. |
| 8,571,307 B2 | 10/2013 | Li et al. |
| 8,579,200 B2 | 11/2013 | Samek et al. |
| 8,583,924 B2 | 11/2013 | Caballero et al. |
| 8,584,945 B2 | 11/2013 | Wang et al. |
| 8,587,595 B2 | 11/2013 | Wang |
| 8,587,697 B2 | 11/2013 | Hussey et al. |
| 8,588,869 B2 | 11/2013 | Sauerwein et al. |
| 8,590,789 B2 | 11/2013 | Nahill et al. |
| 8,595,539 B2 | 11/2013 | Funada |
| 8,596,542 B2 | 12/2013 | Havens et al. |
| 8,596,543 B2 | 12/2013 | Havens et al. |
| 8,599,271 B2 | 12/2013 | Havens et al. |
| 8,599,957 B2 | 12/2013 | Peake et al. |
| 8,600,158 B2 | 12/2013 | Li et al. |
| 8,600,167 B2 | 12/2013 | Showering |
| 8,602,309 B2 | 12/2013 | Longacre et al. |
| 8,608,053 B2 | 12/2013 | Meier et al. |
| 8,608,071 B2 | 12/2013 | Liu et al. |
| 8,611,309 B2 | 12/2013 | Wang et al. |
| 8,615,487 B2 | 12/2013 | Gomez et al. |
| 8,621,123 B2 | 12/2013 | Caballero |
| 8,622,303 B2 | 1/2014 | Meier et al. |
| 8,628,013 B2 | 1/2014 | Ding |
| 8,628,015 B2 | 1/2014 | Wang et al. |
| 8,628,016 B2 | 1/2014 | Winegar |
| 8,629,926 B2 | 1/2014 | Wang |
| 8,630,491 B2 | 1/2014 | Longacre et al. |
| 8,635,309 B2 | 1/2014 | Berthiaume et al. |
| 8,636,200 B2 | 1/2014 | Kearney |
| 8,636,212 B2 | 1/2014 | Nahill et al. |
| 8,636,215 B2 | 1/2014 | Ding et al. |
| 8,636,224 B2 | 1/2014 | Wang |
| 8,638,806 B2 | 1/2014 | Wang et al. |
| 8,640,958 B2 | 2/2014 | Lu et al. |
| 8,640,960 B2 | 2/2014 | Wang et al. |
| 8,643,717 B2 | 2/2014 | Li et al. |
| 8,646,692 B2 | 2/2014 | Meier et al. |
| 8,646,694 B2 | 2/2014 | Wang et al. |
| 8,657,200 B2 | 2/2014 | Ren et al. |
| 8,659,397 B2 | 2/2014 | Vargo et al. |
| 8,668,149 B2 | 3/2014 | Good |
| 8,678,285 B2 | 3/2014 | Kearney |
| 8,678,286 B2 | 3/2014 | Smith et al. |
| 8,682,077 B1 | 3/2014 | Longacre, Jr. |
| D702,237 S | 4/2014 | Oberpriller et al. |
| 8,687,282 B2 | 4/2014 | Feng et al. |
| 8,692,921 B2 | 4/2014 | Nakagawa et al. |
| 8,695,880 B2 | 4/2014 | Bremer et al. |
| 8,698,949 B2 | 4/2014 | Grunow et al. |
| 8,702,000 B2 | 4/2014 | Barber et al. |
| 8,717,494 B2 | 5/2014 | Gannon |
| 8,720,783 B2 | 5/2014 | Biss et al. |
| 8,723,804 B2 | 5/2014 | Fletcher et al. |
| 8,723,904 B2 | 5/2014 | Marty et al. |
| 8,727,223 B2 | 5/2014 | Wang |
| 8,740,082 B2 | 6/2014 | Wilz, Sr. |
| 8,740,085 B2 | 6/2014 | Furlong et al. |
| 8,746,563 B2 | 6/2014 | Hennick et al. |
| 8,750,445 B2 | 6/2014 | Peake et al. |
| 8,752,766 B2 | 6/2014 | Xian et al. |
| 8,756,059 B2 | 6/2014 | Braho et al. |
| 8,757,495 B2 | 6/2014 | Qu et al. |
| 8,760,563 B2 | 6/2014 | Koziol et al. |
| 8,763,909 B2 | 7/2014 | Reed et al. |
| 8,777,108 B2 | 7/2014 | Coyle |
| 8,777,109 B2 | 7/2014 | Oberpriller et al. |
| 8,779,898 B2 | 7/2014 | Havens et al. |
| 8,781,520 B2 | 7/2014 | Payne et al. |
| 8,783,573 B2 | 7/2014 | Havens et al. |
| 8,789,757 B2 | 7/2014 | Barten |
| 8,789,758 B2 | 7/2014 | Hawley et al. |
| 8,789,759 B2 | 7/2014 | Xian et al. |

(56) References Cited

U.S. PATENT DOCUMENTS

| | | |
|---|---|---|
| 8,794,520 B2 | 8/2014 | Wang et al. |
| 8,794,522 B2 | 8/2014 | Ehrhart |
| 8,794,525 B2 | 8/2014 | Amundsen et al. |
| 8,794,526 B2 | 8/2014 | Wang et al. |
| 8,798,367 B2 | 8/2014 | Ellis |
| 8,807,431 B2 | 8/2014 | Wang et al. |
| 8,807,432 B2 | 8/2014 | Van et al. |
| 8,820,630 B2 | 9/2014 | Qu et al. |
| 8,822,848 B2 | 9/2014 | Meagher |
| 8,824,692 B2 | 9/2014 | Sheerin et al. |
| 8,824,696 B2 | 9/2014 | Braho |
| 8,842,849 B2 | 9/2014 | Wahl et al. |
| 8,844,822 B2 | 9/2014 | Kotlarsky et al. |
| 8,844,823 B2 | 9/2014 | Fritz et al. |
| 8,849,019 B2 | 9/2014 | Li et al. |
| D716,285 S | 10/2014 | Chaney et al. |
| 8,851,383 B2 | 10/2014 | Yeakley et al. |
| 8,854,633 B2 | 10/2014 | Laffargue et al. |
| 8,866,963 B2 | 10/2014 | Grunow et al. |
| 8,868,421 B2 | 10/2014 | Braho et al. |
| 8,868,519 B2 | 10/2014 | Maloy et al. |
| 8,868,802 B2 | 10/2014 | Barten |
| 8,868,803 B2 | 10/2014 | Caballero |
| 8,870,074 B1 | 10/2014 | Gannon |
| 8,879,639 B2 | 11/2014 | Sauerwein, Jr. |
| 8,880,426 B2 | 11/2014 | Smith |
| 8,881,983 B2 | 11/2014 | Havens et al. |
| 8,881,987 B2 | 11/2014 | Wang |
| 8,903,172 B2 | 12/2014 | Smith |
| 8,908,995 B2 | 12/2014 | Benos et al. |
| 8,910,870 B2 | 12/2014 | Li et al. |
| 8,910,875 B2 | 12/2014 | Ren et al. |
| 8,914,290 B2 | 12/2014 | Hendrickson et al. |
| 8,914,788 B2 | 12/2014 | Pettinelli et al. |
| 8,915,439 B2 | 12/2014 | Feng et al. |
| 8,915,444 B2 | 12/2014 | Havens et al. |
| 8,916,789 B2 | 12/2014 | Woodburn |
| 8,918,250 B2 | 12/2014 | Hollifield |
| 8,918,564 B2 | 12/2014 | Caballero |
| 8,925,818 B2 | 1/2015 | Kosecki et al. |
| 8,939,374 B2 | 1/2015 | Jovanovski et al. |
| 8,942,480 B2 | 1/2015 | Ellis |
| 8,944,313 B2 | 2/2015 | Williams et al. |
| 8,944,327 B2 | 2/2015 | Meier et al. |
| 8,944,332 B2 | 2/2015 | Harding et al. |
| 8,950,678 B2 | 2/2015 | Germaine et al. |
| D723,560 S | 3/2015 | Zhou et al. |
| 8,967,468 B2 | 3/2015 | Gomez et al. |
| 8,971,346 B2 | 3/2015 | Sevier |
| 8,976,030 B2 | 3/2015 | Cunningham et al. |
| 8,976,368 B2 | 3/2015 | El et al. |
| 8,978,981 B2 | 3/2015 | Guan |
| 8,978,983 B2 | 3/2015 | Bremer et al. |
| 8,978,984 B2 | 3/2015 | Hennick et al. |
| 8,985,456 B2 | 3/2015 | Zhu et al. |
| 8,985,457 B2 | 3/2015 | Soule et al. |
| 8,985,459 B2 | 3/2015 | Kearney et al. |
| 8,985,461 B2 | 3/2015 | Gelay et al. |
| 8,988,578 B2 | 3/2015 | Showering |
| 8,988,590 B2 | 3/2015 | Gillet et al. |
| 8,991,704 B2 | 3/2015 | Hopper et al. |
| 8,996,194 B2 | 3/2015 | Davis et al. |
| 8,996,384 B2 | 3/2015 | Funyak et al. |
| 8,998,091 B2 | 4/2015 | Edmonds et al. |
| 9,002,641 B2 | 4/2015 | Showering |
| 9,007,368 B2 | 4/2015 | Laffargue et al. |
| 9,010,641 B2 | 4/2015 | Qu et al. |
| 9,015,513 B2 | 4/2015 | Murawski et al. |
| 9,016,576 B2 | 4/2015 | Brady et al. |
| D730,357 S | 5/2015 | Fitch et al. |
| 9,022,288 B2 | 5/2015 | Nahill et al. |
| 9,030,964 B2 | 5/2015 | Essinger et al. |
| 9,033,240 B2 | 5/2015 | Smith et al. |
| 9,033,242 B2 | 5/2015 | Gillet et al. |
| 9,036,054 B2 | 5/2015 | Koziol et al. |
| 9,037,344 B2 | 5/2015 | Chamberlin |
| 9,038,911 B2 | 5/2015 | Xian et al. |
| 9,038,915 B2 | 5/2015 | Smith |
| D730,901 S | 6/2015 | Oberpriller et al. |
| D730,902 S | 6/2015 | Fitch et al. |
| 9,047,098 B2 | 6/2015 | Barten |
| 9,047,359 B2 | 6/2015 | Caballero et al. |
| 9,047,420 B2 | 6/2015 | Caballero |
| 9,047,525 B2 | 6/2015 | Barber et al. |
| 9,047,531 B2 | 6/2015 | Showering et al. |
| 9,049,640 B2 | 6/2015 | Wang et al. |
| 9,053,055 B2 | 6/2015 | Caballero |
| 9,053,378 B1 | 6/2015 | Hou et al. |
| 9,053,380 B2 | 6/2015 | Xian et al. |
| 9,057,641 B2 | 6/2015 | Amundsen et al. |
| 9,058,526 B2 | 6/2015 | Powilleit |
| 9,061,527 B2 | 6/2015 | Tobin et al. |
| 9,064,165 B2 | 6/2015 | Havens et al. |
| 9,064,167 B2 | 6/2015 | Xian et al. |
| 9,064,168 B2 | 6/2015 | Todeschini et al. |
| 9,064,254 B2 | 6/2015 | Todeschini et al. |
| 9,066,032 B2 | 6/2015 | Wang |
| 9,070,032 B2 | 6/2015 | Corcoran |
| D734,339 S | 7/2015 | Zhou et al. |
| D734,751 S | 7/2015 | Oberpriller et al. |
| 9,076,459 B2 | 7/2015 | Braho et al. |
| 9,079,423 B2 | 7/2015 | Bouverie et al. |
| 9,080,856 B2 | 7/2015 | Laffargue |
| 9,082,023 B2 | 7/2015 | Feng et al. |
| 9,084,032 B2 | 7/2015 | Rautiola et al. |
| 9,087,250 B2 | 7/2015 | Coyle |
| 9,092,681 B2 | 7/2015 | Havens et al. |
| 9,092,682 B2 | 7/2015 | Wilz et al. |
| 9,092,683 B2 | 7/2015 | Koziol et al. |
| 9,093,141 B2 | 7/2015 | Liu |
| 9,098,763 B2 | 8/2015 | Lu et al. |
| 9,104,929 B2 | 8/2015 | Todeschini |
| 9,104,934 B2 | 8/2015 | Li et al. |
| 9,107,484 B2 | 8/2015 | Chaney |
| 9,111,159 B2 | 8/2015 | Liu et al. |
| 9,111,166 B2 | 8/2015 | Cunningham, IV |
| 9,135,483 B2 | 9/2015 | Liu et al. |
| 9,137,009 B1 | 9/2015 | Gardiner |
| 9,141,839 B2 | 9/2015 | Xian et al. |
| 9,147,096 B2 | 9/2015 | Wang |
| 9,148,474 B2 | 9/2015 | Skvoretz |
| 9,158,000 B2 | 10/2015 | Sauerwein, Jr. |
| 9,158,340 B2 | 10/2015 | Reed et al. |
| 9,158,953 B2 | 10/2015 | Gillet et al. |
| 9,159,059 B2 | 10/2015 | Daddabbo et al. |
| 9,165,174 B2 | 10/2015 | Huck |
| 9,171,543 B2 | 10/2015 | Emerick et al. |
| 9,183,425 B2 | 11/2015 | Wang |
| 9,189,669 B2 | 11/2015 | Zhu et al. |
| 9,195,844 B2 | 11/2015 | Todeschini et al. |
| 9,202,458 B2 | 12/2015 | Braho et al. |
| 9,203,992 B2 | 12/2015 | Ohhashi |
| 9,208,366 B2 | 12/2015 | Liu |
| 9,208,367 B2 | 12/2015 | Smith |
| 9,219,836 B2 | 12/2015 | Bouverie et al. |
| 9,224,022 B2 | 12/2015 | Ackley et al. |
| 9,224,024 B2 | 12/2015 | Bremer et al. |
| 9,224,027 B2 | 12/2015 | Van et al. |
| D747,321 S | 1/2016 | London et al. |
| 9,230,140 B1 | 1/2016 | Ackley |
| 9,235,553 B2 | 1/2016 | Fitch et al. |
| 9,239,950 B2 | 1/2016 | Fletcher |
| 9,245,492 B2 | 1/2016 | Ackley et al. |
| 9,248,640 B2 | 2/2016 | Heng |
| 9,250,652 B2 | 2/2016 | London et al. |
| 9,250,712 B1 | 2/2016 | Todeschini |
| 9,251,411 B2 | 2/2016 | Todeschini |
| 9,258,033 B2 | 2/2016 | Showering |
| 9,262,633 B1 | 2/2016 | Todeschini et al. |
| 9,262,660 B2 | 2/2016 | Lu et al. |
| 9,262,662 B2 | 2/2016 | Chen et al. |
| 9,269,036 B2 | 2/2016 | Bremer |
| 9,270,782 B2 | 2/2016 | Hala et al. |
| 9,274,812 B2 | 3/2016 | Doren et al. |

(56) References Cited

U.S. PATENT DOCUMENTS

| | | |
|---|---|---|
| 9,275,388 B2 | 3/2016 | Havens et al. |
| 9,277,668 B2 | 3/2016 | Feng et al. |
| 9,280,693 B2 | 3/2016 | Feng et al. |
| 9,286,496 B2 | 3/2016 | Smith |
| 9,297,900 B2 | 3/2016 | Jiang |
| 9,298,964 B2 | 3/2016 | Li et al. |
| 9,301,427 B2 | 3/2016 | Feng et al. |
| 9,304,376 B2 | 4/2016 | Anderson |
| 9,310,609 B2 | 4/2016 | Rueblinger et al. |
| 9,313,377 B2 | 4/2016 | Todeschini et al. |
| 9,317,037 B2 | 4/2016 | Byford et al. |
| D757,009 S | 5/2016 | Oberpriller et al. |
| 9,342,723 B2 | 5/2016 | Liu et al. |
| 9,342,724 B2 | 5/2016 | McCloskey et al. |
| 9,360,304 B2 | 6/2016 | Xue et al. |
| 9,361,882 B2 | 6/2016 | Ressler et al. |
| 9,365,381 B2 | 6/2016 | Colonel et al. |
| 9,373,018 B2 | 6/2016 | Colavito et al. |
| 9,375,945 B1 | 6/2016 | Bowles |
| 9,378,403 B2 | 6/2016 | Wang et al. |
| D760,719 S | 7/2016 | Zhou et al. |
| 9,383,848 B2 | 7/2016 | Daghigh |
| 9,384,374 B2 | 7/2016 | Bianconi |
| 9,390,596 B1 | 7/2016 | Todeschini |
| D762,604 S | 8/2016 | Fitch et al. |
| 9,411,386 B2 | 8/2016 | Sauerwein, Jr. |
| 9,412,242 B2 | 8/2016 | Van et al. |
| 9,418,269 B2 | 8/2016 | Havens et al. |
| 9,418,270 B2 | 8/2016 | Van et al. |
| 9,423,318 B2 | 8/2016 | Liu et al. |
| D766,244 S | 9/2016 | Zhou et al. |
| 9,443,123 B2 | 9/2016 | Hejl |
| 9,443,222 B2 | 9/2016 | Singel et al. |
| 9,454,689 B2 | 9/2016 | McCloskey et al. |
| 9,464,885 B2 | 10/2016 | Lloyd et al. |
| 9,465,967 B2 | 10/2016 | Xian et al. |
| 9,478,113 B2 | 10/2016 | Xie et al. |
| 9,478,983 B2 | 10/2016 | Kather et al. |
| D771,631 S | 11/2016 | Fitch et al. |
| 9,481,186 B2 | 11/2016 | Bouverie et al. |
| 9,488,986 B1 | 11/2016 | Solanki |
| 9,489,782 B2 | 11/2016 | Payne et al. |
| 9,490,540 B1 | 11/2016 | Davies et al. |
| 9,491,729 B2 | 11/2016 | Rautiola et al. |
| 9,497,092 B2 | 11/2016 | Gomez et al. |
| 9,507,974 B1 | 11/2016 | Todeschini |
| 9,519,814 B2 | 12/2016 | Cudzilo |
| 9,521,331 B2 | 12/2016 | Bessettes et al. |
| 9,530,038 B2 | 12/2016 | Xian et al. |
| D777,166 S | 1/2017 | Bidwell et al. |
| 9,558,386 B2 | 1/2017 | Yeakley |
| 9,572,901 B2 | 2/2017 | Todeschini |
| 9,606,581 B1 | 3/2017 | Howe et al. |
| D783,601 S | 4/2017 | Schulte et al. |
| D785,617 S | 5/2017 | Bidwell et al. |
| D785,636 S | 5/2017 | Oberpriller et al. |
| 9,646,189 B2 | 5/2017 | Lu et al. |
| 9,646,191 B2 | 5/2017 | Unemyr et al. |
| 9,652,648 B2 | 5/2017 | Ackley et al. |
| 9,652,653 B2 | 5/2017 | Todeschini et al. |
| 9,656,487 B2 | 5/2017 | Ho et al. |
| 9,659,198 B2 | 5/2017 | Giordano et al. |
| D790,505 S | 6/2017 | Vargo et al. |
| D790,546 S | 6/2017 | Zhou et al. |
| 9,680,282 B2 | 6/2017 | Hanenburg |
| 9,697,401 B2 | 7/2017 | Feng et al. |
| 9,701,140 B1 | 7/2017 | Alaganchetty et al. |
| 10,263,443 B2 * | 4/2019 | Colavito .............. G08B 21/182 |
| 2004/0147293 A1 | 7/2004 | Park |
| 2006/0061332 A1 * | 3/2006 | Neu .................... H01M 2/1066 |
| | | 320/132 |
| 2007/0063048 A1 * | 3/2007 | Havens .............. G06K 7/10702 |
| | | 235/462.46 |
| 2009/0134221 A1 | 5/2009 | Zhu et al. |
| 2010/0134072 A1 | 6/2010 | Neu et al. |
| 2010/0177076 A1 | 7/2010 | Essinger et al. |
| 2010/0177080 A1 | 7/2010 | Essinger et al. |
| 2010/0177707 A1 | 7/2010 | Essinger et al. |
| 2010/0177749 A1 | 7/2010 | Essinger et al. |
| 2010/0317413 A1 | 12/2010 | Tan |
| 2011/0111801 A1 | 5/2011 | De Weerd |
| 2011/0169999 A1 | 7/2011 | Grunow et al. |
| 2011/0202554 A1 | 8/2011 | Powilleit et al. |
| 2012/0111946 A1 | 5/2012 | Golant |
| 2012/0168512 A1 | 7/2012 | Kotlarsky et al. |
| 2012/0193423 A1 | 8/2012 | Samek |
| 2012/0203647 A1 | 8/2012 | Smith |
| 2012/0223141 A1 | 9/2012 | Good et al. |
| 2013/0043312 A1 | 2/2013 | Van Horn |
| 2013/0075168 A1 | 3/2013 | Amundsen et al. |
| 2013/0175341 A1 | 7/2013 | Kearney et al. |
| 2013/0175343 A1 | 7/2013 | Good |
| 2013/0257744 A1 | 10/2013 | Daghigh et al. |
| 2013/0257759 A1 | 10/2013 | Daghigh |
| 2013/0270346 A1 | 10/2013 | Xian et al. |
| 2013/0292475 A1 | 11/2013 | Kotlarsky et al. |
| 2013/0292477 A1 | 11/2013 | Hennick et al. |
| 2013/0293539 A1 | 11/2013 | Hunt et al. |
| 2013/0293540 A1 | 11/2013 | Laffargue et al. |
| 2013/0306728 A1 | 11/2013 | Thuries et al. |
| 2013/0306731 A1 | 11/2013 | Pedrao |
| 2013/0307964 A1 | 11/2013 | Bremer et al. |
| 2013/0308625 A1 | 11/2013 | Park et al. |
| 2013/0313324 A1 | 11/2013 | Koziol et al. |
| 2013/0332524 A1 | 12/2013 | Fiala et al. |
| 2014/0001267 A1 | 1/2014 | Giordano et al. |
| 2014/0002828 A1 | 1/2014 | Laffargue et al. |
| 2014/0025584 A1 | 1/2014 | Liu et al. |
| 2014/0034734 A1 | 2/2014 | Sauerwein, Jr. |
| 2014/0039693 A1 | 2/2014 | Havens et al. |
| 2014/0049120 A1 | 2/2014 | Kohtz et al. |
| 2014/0049635 A1 | 2/2014 | Laffargue et al. |
| 2014/0061306 A1 | 3/2014 | Wu et al. |
| 2014/0063289 A1 | 3/2014 | Hussey et al. |
| 2014/0066136 A1 | 3/2014 | Sauerwein et al. |
| 2014/0067692 A1 | 3/2014 | Ye et al. |
| 2014/0070005 A1 | 3/2014 | Nahill et al. |
| 2014/0071840 A1 | 3/2014 | Venancio |
| 2014/0074746 A1 | 3/2014 | Wang |
| 2014/0076974 A1 | 3/2014 | Havens et al. |
| 2014/0078342 A1 | 3/2014 | Li et al. |
| 2014/0098792 A1 | 4/2014 | Wang et al. |
| 2014/0100774 A1 | 4/2014 | Showering |
| 2014/0100813 A1 | 4/2014 | Showering |
| 2014/0103115 A1 | 4/2014 | Meier et al. |
| 2014/0104413 A1 | 4/2014 | McCloskey et al. |
| 2014/0104414 A1 | 4/2014 | McCloskey et al. |
| 2014/0104416 A1 | 4/2014 | Giordano et al. |
| 2014/0106725 A1 | 4/2014 | Sauerwein, Jr. |
| 2014/0108010 A1 | 4/2014 | Maltseff et al. |
| 2014/0108402 A1 | 4/2014 | Gomez et al. |
| 2014/0108682 A1 | 4/2014 | Caballero |
| 2014/0110485 A1 | 4/2014 | Toa et al. |
| 2014/0114530 A1 | 4/2014 | Fitch et al. |
| 2014/0125853 A1 | 5/2014 | Wang |
| 2014/0125999 A1 | 5/2014 | Longacre et al. |
| 2014/0129378 A1 | 5/2014 | Richardson |
| 2014/0131443 A1 | 5/2014 | Smith |
| 2014/0131444 A1 | 5/2014 | Wang |
| 2014/0132201 A1 * | 5/2014 | Tsang .................... H02J 7/025 |
| | | 320/107 |
| 2014/0133379 A1 | 5/2014 | Wang et al. |
| 2014/0136208 A1 | 5/2014 | Maltseff et al. |
| 2014/0140585 A1 | 5/2014 | Wang |
| 2014/0152882 A1 | 6/2014 | Samek et al. |
| 2014/0158770 A1 | 6/2014 | Sevier et al. |
| 2014/0159869 A1 | 6/2014 | Zumsteg et al. |
| 2014/0166755 A1 | 6/2014 | Liu et al. |
| 2014/0166757 A1 | 6/2014 | Smith |
| 2014/0168787 A1 | 6/2014 | Wang et al. |
| 2014/0175165 A1 | 6/2014 | Havens et al. |
| 2014/0191913 A1 | 7/2014 | Ge et al. |
| 2014/0197239 A1 | 7/2014 | Havens et al. |

(56) References Cited

U.S. PATENT DOCUMENTS

| | | |
|---|---|---|
| 2014/0197304 A1* | 7/2014 | Feng .................. G02B 3/14 250/208.1 |
| 2014/0204268 A1 | 7/2014 | Grunow et al. |
| 2014/0214631 A1 | 7/2014 | Hansen |
| 2014/0217166 A1 | 8/2014 | Berthiaume et al. |
| 2014/0217180 A1 | 8/2014 | Liu |
| 2014/0231500 A1 | 8/2014 | Ehrhart et al. |
| 2014/0247315 A1 | 9/2014 | Marty et al. |
| 2014/0263493 A1 | 9/2014 | Amurgis et al. |
| 2014/0263645 A1 | 9/2014 | Smith et al. |
| 2014/0270196 A1 | 9/2014 | Braho et al. |
| 2014/0270229 A1 | 9/2014 | Braho |
| 2014/0278387 A1 | 9/2014 | Digregorio |
| 2014/0282210 A1 | 9/2014 | Bianconi |
| 2014/0288933 A1 | 9/2014 | Braho et al. |
| 2014/0297058 A1 | 10/2014 | Barker et al. |
| 2014/0299665 A1 | 10/2014 | Barber et al. |
| 2014/0351317 A1 | 11/2014 | Smith et al. |
| 2014/0362184 A1 | 12/2014 | Jovanovski et al. |
| 2014/0363015 A1 | 12/2014 | Braho |
| 2014/0369511 A1 | 12/2014 | Sheerin et al. |
| 2014/0374483 A1 | 12/2014 | Lu |
| 2014/0374485 A1 | 12/2014 | Xian et al. |
| 2015/0001301 A1 | 1/2015 | Ouyang |
| 2015/0009338 A1 | 1/2015 | Laffargue et al. |
| 2015/0014416 A1 | 1/2015 | Kotlarsky et al. |
| 2015/0021397 A1 | 1/2015 | Rueblinger et al. |
| 2015/0028104 A1 | 1/2015 | Ma et al. |
| 2015/0029002 A1 | 1/2015 | Yeakley et al. |
| 2015/0032709 A1 | 1/2015 | Maloy et al. |
| 2015/0039309 A1 | 2/2015 | Braho et al. |
| 2015/0040378 A1 | 2/2015 | Saber et al. |
| 2015/0042287 A1* | 2/2015 | Liu .................. H02J 7/0027 320/134 |
| 2015/0049347 A1 | 2/2015 | Laffargue et al. |
| 2015/0051992 A1 | 2/2015 | Smith |
| 2015/0053769 A1 | 2/2015 | Thuries et al. |
| 2015/0062366 A1 | 3/2015 | Liu et al. |
| 2015/0063215 A1 | 3/2015 | Wang |
| 2015/0088522 A1 | 3/2015 | Hendrickson et al. |
| 2015/0096872 A1 | 4/2015 | Woodburn |
| 2015/0100196 A1 | 4/2015 | Hollifield |
| 2015/0115035 A1 | 4/2015 | Meier et al. |
| 2015/0127791 A1 | 5/2015 | Kosecki et al. |
| 2015/0128116 A1 | 5/2015 | Chen et al. |
| 2015/0133047 A1 | 5/2015 | Smith et al. |
| 2015/0134470 A1 | 5/2015 | Hejl et al. |
| 2015/0136851 A1 | 5/2015 | Harding et al. |
| 2015/0142492 A1 | 5/2015 | Kumar |
| 2015/0144692 A1 | 5/2015 | Hejl |
| 2015/0144698 A1 | 5/2015 | Teng et al. |
| 2015/0149946 A1 | 5/2015 | Benos et al. |
| 2015/0161429 A1 | 6/2015 | Xian |
| 2015/0186703 A1 | 7/2015 | Chen et al. |
| 2015/0199957 A1 | 7/2015 | Funyak et al. |
| 2015/0210199 A1 | 7/2015 | Payne |
| 2015/0220753 A1 | 8/2015 | Zhu et al. |
| 2015/0254485 A1 | 9/2015 | Feng et al. |
| 2015/0310243 A1 | 10/2015 | Ackley et al. |
| 2015/0310389 A1 | 10/2015 | Crimm et al. |
| 2015/0312827 A1 | 10/2015 | Okita et al. |
| 2015/0327012 A1 | 11/2015 | Bian et al. |
| 2016/0014251 A1 | 1/2016 | Hejl |
| 2016/0040982 A1 | 2/2016 | Li et al. |
| 2016/0042241 A1 | 2/2016 | Todeschini |
| 2016/0057230 A1 | 2/2016 | Todeschini et al. |
| 2016/0062473 A1 | 3/2016 | Bouchat et al. |
| 2016/0092805 A1 | 3/2016 | Geisler et al. |
| 2016/0101936 A1 | 4/2016 | Chamberlin |
| 2016/0102975 A1 | 4/2016 | McCloskey et al. |
| 2016/0104019 A1 | 4/2016 | Todeschini et al. |
| 2016/0104274 A1 | 4/2016 | Jovanovski et al. |
| 2016/0109219 A1 | 4/2016 | Ackley et al. |
| 2016/0109220 A1 | 4/2016 | Laffargue et al. |
| 2016/0109224 A1 | 4/2016 | Thuries et al. |
| 2016/0112631 A1 | 4/2016 | Ackley et al. |
| 2016/0112643 A1 | 4/2016 | Laffargue et al. |
| 2016/0117627 A1 | 4/2016 | Raj et al. |
| 2016/0124516 A1 | 5/2016 | Schoon et al. |
| 2016/0125217 A1 | 5/2016 | Todeschini |
| 2016/0125342 A1 | 5/2016 | Miller et al. |
| 2016/0125873 A1 | 5/2016 | Braho et al. |
| 2016/0133253 A1 | 5/2016 | Braho et al. |
| 2016/0171597 A1 | 6/2016 | Todeschini |
| 2016/0171666 A1 | 6/2016 | McCloskey |
| 2016/0171720 A1 | 6/2016 | Todeschini |
| 2016/0171775 A1 | 6/2016 | Todeschini et al. |
| 2016/0171777 A1 | 6/2016 | Todeschini et al. |
| 2016/0174674 A1 | 6/2016 | Oberpriller et al. |
| 2016/0178479 A1 | 6/2016 | Goldsmith |
| 2016/0178685 A1 | 6/2016 | Young et al. |
| 2016/0178707 A1 | 6/2016 | Young et al. |
| 2016/0179132 A1 | 6/2016 | Harr |
| 2016/0179143 A1 | 6/2016 | Bidwell et al. |
| 2016/0179368 A1 | 6/2016 | Roeder |
| 2016/0179378 A1 | 6/2016 | Kent et al. |
| 2016/0180130 A1 | 6/2016 | Bremer |
| 2016/0180133 A1 | 6/2016 | Oberpriller et al. |
| 2016/0180136 A1 | 6/2016 | Meier et al. |
| 2016/0180594 A1 | 6/2016 | Todeschini |
| 2016/0180663 A1 | 6/2016 | McMahan et al. |
| 2016/0180678 A1 | 6/2016 | Ackley et al. |
| 2016/0180713 A1 | 6/2016 | Bernhardt et al. |
| 2016/0185136 A1 | 6/2016 | Ng et al. |
| 2016/0185291 A1 | 6/2016 | Chamberlin |
| 2016/0186926 A1 | 6/2016 | Oberpriller et al. |
| 2016/0188861 A1 | 6/2016 | Todeschini |
| 2016/0188939 A1 | 6/2016 | Sailors et al. |
| 2016/0188940 A1 | 6/2016 | Lu et al. |
| 2016/0188941 A1 | 6/2016 | Todeschini et al. |
| 2016/0188942 A1 | 6/2016 | Good et al. |
| 2016/0188943 A1 | 6/2016 | Franz |
| 2016/0188944 A1 | 6/2016 | Wilz et al. |
| 2016/0189076 A1 | 6/2016 | Mellott et al. |
| 2016/0189087 A1 | 6/2016 | Morton et al. |
| 2016/0189088 A1 | 6/2016 | Pecorari et al. |
| 2016/0189092 A1 | 6/2016 | George et al. |
| 2016/0189284 A1 | 6/2016 | Mellott et al. |
| 2016/0189288 A1 | 6/2016 | Todeschini et al. |
| 2016/0189366 A1 | 6/2016 | Chamberlin et al. |
| 2016/0189443 A1 | 6/2016 | Smith |
| 2016/0189447 A1 | 6/2016 | Valenzuela |
| 2016/0189489 A1 | 6/2016 | Au et al. |
| 2016/0191684 A1 | 6/2016 | Dipiazza et al. |
| 2016/0192051 A1 | 6/2016 | Dipiazza et al. |
| 2016/0202951 A1 | 7/2016 | Pike et al. |
| 2016/0202958 A1 | 7/2016 | Zabel et al. |
| 2016/0202959 A1 | 7/2016 | Doubleday et al. |
| 2016/0203021 A1 | 7/2016 | Pike et al. |
| 2016/0203429 A1 | 7/2016 | Mellott et al. |
| 2016/0203797 A1 | 7/2016 | Pike et al. |
| 2016/0203820 A1 | 7/2016 | Zabel et al. |
| 2016/0204623 A1 | 7/2016 | Haggerty et al. |
| 2016/0204636 A1 | 7/2016 | Allen et al. |
| 2016/0204638 A1 | 7/2016 | Miraglia et al. |
| 2016/0227912 A1 | 8/2016 | Oberpriller et al. |
| 2016/0232891 A1 | 8/2016 | Pecorari |
| 2016/0292477 A1 | 10/2016 | Bidwell |
| 2016/0294779 A1 | 10/2016 | Yeakley et al. |
| 2016/0306769 A1 | 10/2016 | Kohtz et al. |
| 2016/0314276 A1 | 10/2016 | Wilz et al. |
| 2016/0314294 A1 | 10/2016 | Kubler et al. |
| 2016/0316190 A1 | 10/2016 | McCloskey et al. |
| 2016/0323310 A1 | 11/2016 | Todeschini et al. |
| 2016/0325677 A1 | 11/2016 | Fitch et al. |
| 2016/0327614 A1 | 11/2016 | Young et al. |
| 2016/0327930 A1 | 11/2016 | Charpentier et al. |
| 2016/0328762 A1 | 11/2016 | Pape |
| 2016/0330218 A1 | 11/2016 | Hussey et al. |
| 2016/0343163 A1 | 11/2016 | Venkatesha et al. |
| 2016/0343176 A1 | 11/2016 | Ackley |
| 2016/0364914 A1 | 12/2016 | Todeschini |
| 2016/0370220 A1 | 12/2016 | Ackley et al. |
| 2016/0372282 A1 | 12/2016 | Bandringa |

(56) References Cited

U.S. PATENT DOCUMENTS

| | | |
|---|---|---|
| 2016/0373847 A1 | 12/2016 | Vargo et al. |
| 2016/0377414 A1 | 12/2016 | Thuries et al. |
| 2016/0377417 A1 | 12/2016 | Jovanovski et al. |
| 2017/0010141 A1 | 1/2017 | Ackley |
| 2017/0010328 A1 | 1/2017 | Mullen et al. |
| 2017/0010780 A1 | 1/2017 | Waldron et al. |
| 2017/0016714 A1 | 1/2017 | Laffargue et al. |
| 2017/0018094 A1 | 1/2017 | Todeschini |
| 2017/0046603 A1 | 2/2017 | Lee et al. |
| 2017/0047864 A1 | 2/2017 | Stang et al. |
| 2017/0053146 A1 | 2/2017 | Liu et al. |
| 2017/0053147 A1 | 2/2017 | Germaine et al. |
| 2017/0053647 A1 | 2/2017 | Nichols et al. |
| 2017/0055606 A1 | 3/2017 | Xu et al. |
| 2017/0060316 A1 | 3/2017 | Larson |
| 2017/0061961 A1 | 3/2017 | Nichols et al. |
| 2017/0064634 A1 | 3/2017 | Van et al. |
| 2017/0083730 A1 | 3/2017 | Feng et al. |
| 2017/0091502 A1 | 3/2017 | Furlong et al. |
| 2017/0091706 A1 | 3/2017 | Lloyd et al. |
| 2017/0091741 A1 | 3/2017 | Todeschini |
| 2017/0091904 A1 | 3/2017 | Ventress, Jr. |
| 2017/0092908 A1 | 3/2017 | Chaney |
| 2017/0094238 A1 | 3/2017 | Germaine et al. |
| 2017/0098947 A1 | 4/2017 | Wolski |
| 2017/0100949 A1 | 4/2017 | Celinder et al. |
| 2017/0108838 A1 | 4/2017 | Todeschini et al. |
| 2017/0108895 A1 | 4/2017 | Chamberlin et al. |
| 2017/0118355 A1 | 4/2017 | Wong et al. |
| 2017/0123598 A1 | 5/2017 | Phan et al. |
| 2017/0124369 A1 | 5/2017 | Rueblinger et al. |
| 2017/0124396 A1 | 5/2017 | Todeschini et al. |
| 2017/0124687 A1 | 5/2017 | McCloskey et al. |
| 2017/0126873 A1 | 5/2017 | McGary et al. |
| 2017/0126904 A1 | 5/2017 | D'Armancourt et al. |
| 2017/0139012 A1 | 5/2017 | Smith |
| 2017/0140329 A1 | 5/2017 | Bernhardt et al. |
| 2017/0140731 A1 | 5/2017 | Smith |
| 2017/0147847 A1 | 5/2017 | Berggren et al. |
| 2017/0150124 A1 | 5/2017 | Thuries |
| 2017/0169198 A1 | 6/2017 | Nichols |
| 2017/0171035 A1 | 6/2017 | Lu et al. |
| 2017/0171703 A1 | 6/2017 | Maheswaranathan |
| 2017/0171803 A1 | 6/2017 | Maheswaranathan |
| 2017/0180359 A1 | 6/2017 | Wolski et al. |
| 2017/0180577 A1 | 6/2017 | Nguon et al. |
| 2017/0181299 A1 | 6/2017 | Shi et al. |
| 2017/0190192 A1 | 7/2017 | Delario et al. |
| 2017/0193432 A1 | 7/2017 | Bernhardt |
| 2017/0193461 A1 | 7/2017 | Celinder et al. |
| 2017/0193727 A1 | 7/2017 | Van et al. |
| 2017/0200108 A1 | 7/2017 | Au et al. |
| 2017/0200275 A1 | 7/2017 | McCloskey et al. |

OTHER PUBLICATIONS

Notice of Allowance and Fees Due (PTOL-85) dated Dec 10, 2018 for U.S. Appl. No. 15/870,010.

* cited by examiner

LPIRAG0
*LOW POWER ALERT 10-30%
*FIG. 5A-A*
LPIRAG1
LOW POWER ALERT 10-50%
*FIG. 5A-B*
LPIFNO
LOW POWER ALERT FLASH NUMBER
*FIG. 5A-C*
LPIFDL
INTERVAL BETWEEN FLASHES
*FIG. 5A-D*

LPI_NO
LOW POWER ALERT REPEAT
*FIG. 5A-E*
LPI_DL
INTERVAL BETWEEN ALERTS
*FIG. 5A-F*
LPIBEP0
LOW POWER ALERT BEEP OFF
*FIG. 5A-G*
LPIBEP1_
*LOW POWER ALERT BEEP ON
*FIG. 5A-H*

\*BASRED1
\*BASE POWER COMMUNICATION
INDICATOR ON
*FIG. 5B-A*
\*BASRED0
BASE POWER COMMUNICATION
INDICATOR OFF
*FIG. 5B-B*
RESET_
RESET SCANNER
*FIG. 5B-C*
BASCHG0
BASE CHARGE OFF
*FIG. 5B-D*

BASCHG1
EXTERNAL OR INTERFACE CABLE
POWER
*FIG. 5B-E*
BASCHG2
EXTERNAL POWER ONLY
*FIG. 5B-F*

| SCANNER LED | SCANNER BEEP | POWER LEVEL | APPROXIMATE EXPECTED SCANS |
|---|---|---|---|
| YELLOW (3 SETS OF FLASHES) | 2 SHORT BEEPS PER FLASH | 30% | 100 |
| RED (3 SETS OF FLASHES) | 2 SHORT BEEPS PER FLASH | 10% | 50 |

FIG. 6

| LED INDICATION | BEEPER INDICATION | CAUSE |
|---|---|---|
| NORMAL OPERATION | | |
| RED FLASH | NONE | POWER LEVEL LOW |
| GREEN FLASH | 1 BEEP | SUCCESSFUL COMMUNICATION |
| RED BLINKING | RAZZ OR ERROR TONE | FAILED COMMUNICATION |
| MENU OPERATION | | |
| GREEN FLASH | 2 BEEPS | SUCCESSFUL MENU CHANGE |
| RED BLINKING | RAZZ OR ERROR TONE | UNSUCCESSFUL MENU CHANGE |

FIG. 7

| LED | POWER LEVEL | APPROXIMATE EXPECTED SCAN |
|---|---|---|
| GREEN ON | 100% | 450 |
| GREEN SLOW BLINK | 50-99% | 200 |
| GREEN FAST BLINK | 30-50% | 100 |
| YELLOW FAST BLINK | 0-30% | CHARGING - DO NOT SCAN |

FIG. 9

POWER CAPACITY INDICATOR

CROSS-REFERENCE TO RELATED APPLICATION

The present application is a continuation of U.S. patent application Ser. No. 15/870,010 for a Power Capacity Indicator filed Jan. 12, 2018, which claims the benefit of U.S. Patent Application No. 62/445,811 for a Cradle for Scanner with Power Capacity Indicator filed Jan. 13, 2017, each of which is hereby incorporated by reference in its entirety.

FIELD OF THE INVENTION

The present invention relates to portable electronic devices and more particularly relates to devices for indicating the charge status of rechargeable power supplies used for powering the portable electronic devices.

BACKGROUND

Generally speaking, portable electronic devices are included in many aspects of everyday life. Examples of some portable electronic devices may include cell phones, wireless landline telephones, electric razors, calculators, wireless computer peripherals, radios, flashlights, wireless barcode scanners, just to name a few. Typically, these portable devices are powered by primary cell (non-rechargeable) batteries or secondary cell (rechargeable) batteries.

Although rechargeable batteries are normally a better economic choice than primary cell batteries and add less toxic waste to landfills, other power sources are available for powering portable electronic devices. For example, supercapacitors are a battery-free alternative that provides many advantages over conventional batteries.

Although supercapacitors do not hold a charge for as long as batteries, supercapacitors are able to be charged or recharged much faster than rechargeable batteries. Also, supercapacitors can be discharged and recharged hundreds of thousands of times without losing their charging capacity. On the other hand, rechargeable batteries may only be able to be discharged and recharged a few hundred times before their charging capacity declines to a point of no longer being usable.

Another advantage is that supercapacitors do not degrade like rechargeable batteries and therefore may never need to be replaced. Also, since there are no chemical reactions involved in the charging and discharging of supercapacitors, there is therefore no decay of chemical materials. Thus, supercapacitors can eliminate the environmental issues associated with the use and disposal of primary cell batteries and rechargeable batteries.

Because of the familiarity with rechargeable batteries, many users may have become accustomed to the practice of charging, discharging, and recharging of rechargeable batteries. Particularly, users may be aware that charging batteries before a first use may take hours and that recharging the batteries may take 10-30 minutes, depending on the type of batteries being used. Therefore, a user might repeatedly check the status of the battery charging process until the batteries are eventually ready to be used. Typically, there may be a single indicator for indicating that the rechargeable batteries are ready to be used.

However, since supercapacitors are charged, discharged, and recharged much faster than batteries, a new type of charge status indication process would be beneficial for users. Therefore, a need exists for a power status indicator for indicating more information regarding the charge of a rechargeable power supply, particularly a rechargeable supercapacitor. In this way, a user can be informed of the various stages of charge status levels of the supercapacitors.

SUMMARY

Accordingly, in one aspect, the present disclosure embraces a wireless electronic device which comprises a rechargeable power supply and a power capacity indicator unit. The rechargeable power supply includes at least one supercapacitor. The power capacity indicator unit comprises one or more sensors configured to detect that the wireless electronic device is out of a base charger and is in an idle state for a predetermined idle threshold. The one or more sensors are further configured to detect when a power level of the rechargeable power supply is within at least one predetermined power threshold range. The power capacity indicator unit further comprises a power level comparing unit configured to compare the detected power level of the rechargeable power supply with a plurality of predetermined power threshold levels to determine the at least one predetermined power threshold range. The control unit is configured to activate at least one power status indicator corresponding to the at least one predetermined power threshold range when the wireless electronic device is detected to be out of the base charger and in the idle state for the predetermined idle threshold, and the detection of the power level of the rechargeable power supply is within at least one predetermined power threshold range. In an exemplary embodiment, the wireless electronic device is a handheld barcode scanner. In an embodiment, the power capacity indicator unit is incorporated in the wireless electronic device.

The activation of the at least one power status indicator corresponds to switching of the at least one power status indicator on and off in a predefined pattern to indicate that the power level of the rechargeable power supply is within the at least one predetermined power threshold range. The activated at least one power status indicator indicates at least one alert to a user. In an embodiment, the control unit is configured to activate a first predefined power status indicator in a predefined pattern when the wireless electronic device is not properly supported on the base charger.

In various embodiments, the at least one predetermined power threshold range corresponds to one of a first threshold designating a "near depletion" status or a second range designating a "ready to use but not fully charged" status. The second range is configurable to include at least an upper sub-range and a lower sub-range. The control unit is further configured to set the activation of the at least one power status indicator in a default-on mode for the first range, a default-on mode for the lower sub-range of the second range, and a default-off mode for upper sub-range of the second range.

In an embodiment, the at least one power status indicator is a light emitting diode (LED) of a predefined color. In other embodiments, the at least one power status indicator provides one or more of a visual feedback, an audio feedback, or a tactile feedback.

In another aspect, a power capacity indicator unit is disclosed that comprises one or more sensors configured to detect that a wireless electronic device is out of a base charger and is in an idle state for a predetermined idle threshold. The one or more sensors are further configured to detect when a power level of the rechargeable power supply is within at least one predetermined power threshold range.

A control unit is configured to activate at least one power status indicator corresponding to the at least one predetermined power threshold range when the wireless electronic device is detected to be out of the base charger and in the idle state for the predetermined idle threshold, and the detection of the power level of the rechargeable power supply is within at least one predetermined power threshold range.

The foregoing illustrative summary, as well as other exemplary objectives and/or advantages of the invention, and the manner in which the same are accomplished, are further explained within the following detailed description and its accompanying drawings.

BRIEF DESCRIPTION OF THE DRAWINGS

FIGS. 5A-A to 5A-H illustrate various exemplary configuration barcodes, which may be scanned by an exemplary wireless electronic device for setting various types of low power alerts, in accordance with various embodiments of the disclosure.

FIGS. 5B-A to 5B-F illustrate various exemplary configuration barcodes, which may be scanned by an exemplary wireless electronic device for setting various configuration settings for an exemplary recharging device, in accordance with an embodiment of the disclosure.

FIG. 6 is a diagram of a chart showing implementations of output of exemplary output devices for indicating the charge pack status information of one or more super capacitors in an exemplary rechargeable power supply shown in FIG. 1, in accordance with an embodiment of the disclosure.

FIG. 7 is a diagram of a chart showing implementations of output of exemplary output devices for indicating the status information of an exemplary wireless electronic device in conjunction with an exemplary recharging device shown in FIG. 1, in accordance with an embodiment of the disclosure.

FIG. 9 is a diagram of a chart showing implementations of output of exemplary output devices for indicating the charge pack status information by an exemplary recharging device shown in FIG. 1, in accordance with an embodiment of the disclosure.

DETAILED DESCRIPTION

Figure 1:
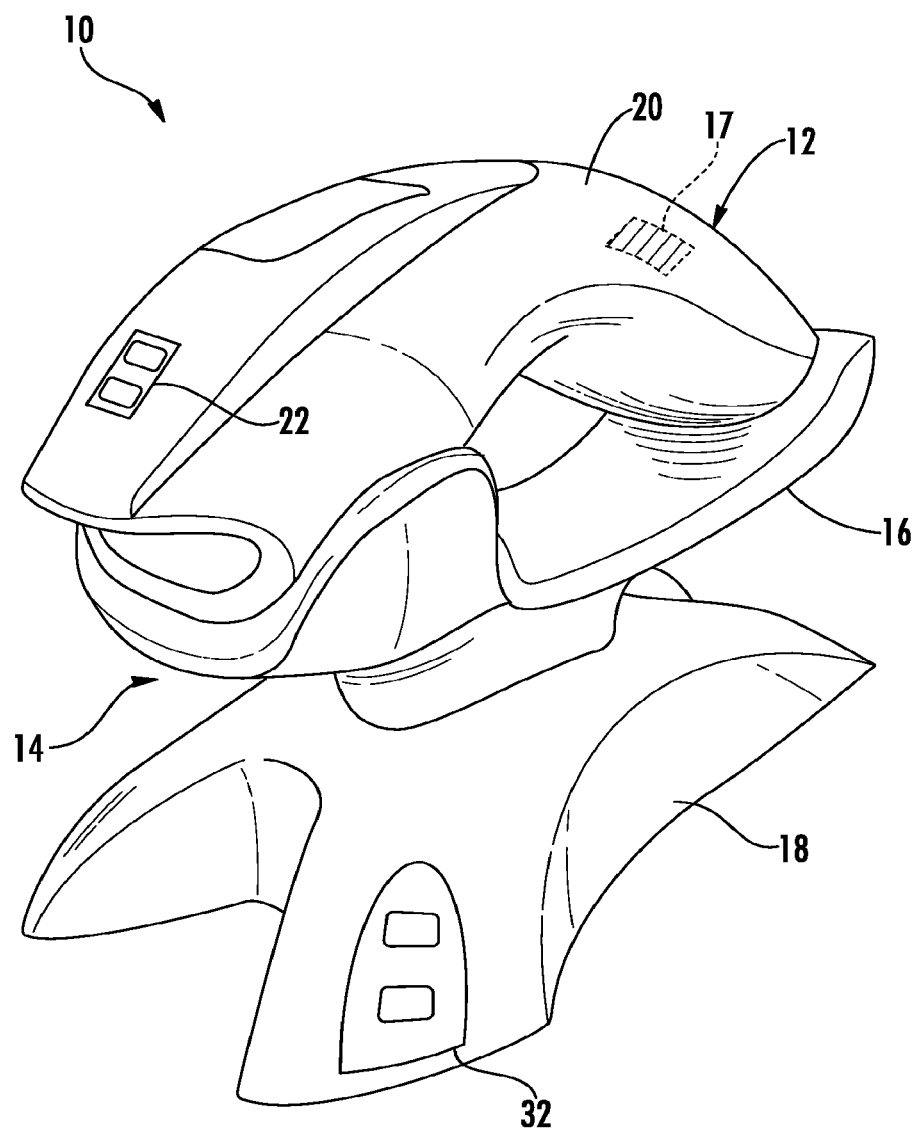
FIG. 1 is a schematic diagram of perspective view of an embodiment of an exemplary charging system, in accordance with an embodiment of the disclosure.

Handheld and/or wireless barcode scanners (i.e., indicia readers) are typically powered by a rechargeable energy storage unit (RESU). Traditionally the RESU has used a battery as its energy storage component. Batteries are optimized to provide energy for prolonged periods of continuous operation, which suits the needs for most electronic devices (e.g., laptops, cellphones, etc.). Barcode scanners, however, typically operate in a different fashion. Active periods are often followed by periods of non-operation. As a result, other energy storage components may be considered for powering the barcode scanner. A super capacitor (i.e., ultra-capacitor, double layer capacitor, etc.), for example, may be suitable energy storage component for an RESU.

The super capacitor stores energy via a static charge rather than an electrochemical reaction or other process. As a result, the charging/operating characteristics required for super-capacitor RESUs are different from battery RESUs. For example, a super-capacitor can be charged more quickly than a lithium-ion (Li-ion) battery. The super capacitor may be charged/discharged many times and typically has a longer service life than a Li-ion battery. As a result, super capacitors may be used for barcode scanning applications, which may require short-term power bursts followed by quick charging periods.

The charging process (i.e., the currents/voltages applied over time) of a super capacitor is different from a Li-ion battery. For example, the super capacitor may accept larger charge currents. The super capacitor cannot be overcharged and does not require the detection of a full-charge since the charge current stops flowing when the super capacitor has reached its charge limit. A Li-ion battery, on the other hand, requires careful control of charging current/voltage, and care should be taken to stop charging when the battery has reached its charge limit. In addition, safety mandates that the temperature of a Li-ion battery be monitored and the charge/use of the Li-ion battery discontinued when the battery becomes excessively warm.

In a battery-free scanner, one of the primary selling points is the fast-charge capability that the super-capacitor power pack allows. Even though the power pack can be fully charged in about 30 seconds, the scanner is actually ready to scan in much less time. For typical battery-charging, the charger (e.g., a charging cradle) provides a "charging" indication (usually via a flashing LED) as well as a "fully charged" indication (usually through a solid ON LED). In a typical use of a scanner with a super-capacitor power pack, the user would not necessarily need to wait for the full-charge indication if there was an indicator that told them that the scanner was "ready-to-scan" even though it was not fully charged.

On the scanner side, it is equally important to notify the user when the power pack has become substantially depleted but well before it is nearing full depletion. A super-capacitor power pack typically depletes far faster than most scanner users are accustomed to with wireless scanners. Thus, it is desirable for the customer/user to be alerted when the power pack energy level falls below a certain percentage (e.g., 50 percent, 40 percent, 30 percent, 20 percent, 10 percent, and/or 5 percent).

Most typical scanner customers use scanners that have large battery capacities. Therefore, charge times are long and so are use-times. But the super-capacitor power pack provides a very different user experience in which the user gets the benefit of the fast charge but also gets limited use-time as a trade-off. The trade-off is not bad as long as the user gets notified with an easy to understand message about the status of the power pack energy level. In an exemplary scanner, RED, YELLOW, GREEN color coding indicators provide an intuitive indication of "bad" status (near depletion), "caution" status (ready to scan but not fully charged), and "go" status (fully charged). Exemplary scanners may use other colors (e.g., white, blue, pink, purple, orange, etc.) and may provide indications of more than the just "bad" status (near depletion), the "caution" status (ready to scan but not fully charged), and the "go" status (fully charged), such as percentage charged, number of scans left, etc. Furthermore, other power indicators (e.g., audible alerts, tactile feedback, or a wireless signal (e.g., Bluetooth) to another device) may be used to provide such indications. In addition, variations of the notifications (such as adjustments to the threshold levels for the indicators, colors, flashing rates, etc.) can be easily made through configuration or through re-programming. In an exemplary scanner, a change in the indicator may also trigger the initiation of or a change in the charging state or rate, the initiation of or a change in discharge rate, and/or the sending of an alert to another device or the user (e.g., to cause the user to take action).

FIG. 1 is a schematic diagram of a perspective view of an embodiment of a charging system 10. In this embodiment, the charging system 10 includes a wireless electronic device 12 and a recharging device 14. The wireless electronic device 12 may be a handheld device, such as a wireless barcode scanner or laser scanner. In other embodiments, the wireless electronic device 12 may include other types of portable devices, such as wireless landline telephones, electric razors, calculators, flashlights, etc.

The recharging device 14 in the embodiment of FIG. 1 includes a cradle 16 and a base charger 18. The cradle 16 may be designed to support the wireless electronic device 12 and may include electrical contacts (not shown in FIG. 1) for making electrical connection with the wireless electronic device 12. In this manner, electrical power can be provided to the wireless electronic device 12 from the cradle 16 to charge or recharge a rechargeable power supply 17. In an embodiment, the rechargeable power supply 17 may be attached externally to a housing 20 of the wireless electronic device 12. In an alternative embodiment, as shown in FIG. 1, the rechargeable power supply 17 may be disposed inside the housing 20 of the wireless electronic device 12. The rechargeable power supply 17 may include one or more super capacitors. In an embodiment, the recharging device 14 may charge the one or more super capacitors of the rechargeable power supply 17 in the wireless electronic device 12 by use of a cable plugged into an outlet. In another embodiment, the recharging device 14 may charge the super capacitor of the rechargeable power supply 17 in the wireless electronic device 12 by use of both a battery and a cable.

In some embodiments, the wireless electronic device 12 may include a power status indicator 22 for indicating the power level of the rechargeable power supply 17. The power status indicator 22 may further indicate other information, such as linking status, decoding state, and instant charge pack condition of at least one supercapacitor of the rechargeable power supply 17. As shown, in an embodiment, the power status indicator 22 may correspond to one or more light sources (e.g., an LED or multiple LEDs) and/or beepers to indicate various power levels, such as full power, lower power, and/or no power. In an alternative or additional embodiment, the power status indicator 22 may correspond to a speaker for providing audible warnings. In yet another alternative or additional embodiment, the power status indicator 22 may correspond to a vibration device to provide tactile feedback to the user. The power status indicator 22 on the wireless electronic device 12 may also provide real time charge status when charging. Furthermore, the functioning of the power status indicator 22 may be programmed to match the user's needs (e.g., by the user, the owner of the device, the manufacturer, and/or the distributor).

In an exemplary embodiment, one or more indicators in the power status indicator 22 may be positioned in two different locations to give the appearance of separate indicators. In an alternative embodiment, the one or more indicators may be located under an opaque window to give the appearance of the same indicator providing two (or more) different colors of light. With an opaque or semi-opaque window, a user would perceive that the light may be coming from the same location and may not notice the difference in the locations of the one or more indicators. Likewise, the one or more indicators may also be positioned in different locations (as shown) or under the same opaque window to give the perception of the same location with different colors.

One embodiment may include incorporating the power status indicator 22 only on the wireless electronic device 12. A second embodiment may include incorporating another power indicator, such as power status indicator 32, similar to the first power status indicator 22 on the wireless electronic device 12, on the base charger 18. A third embodiment may include incorporating the power status indicator 32 only on the base charger 18. Various exemplary implementations of output of the power status indicator 22 and 32, under the control of a power capacity indicator unit, for indicating power status information are indicated by charts 90 to 120 in FIGS. 6 to 9.

According to the embodiment of FIG. 1, the base charger 18 of the recharging device 14 may be configured to hold the cradle 16 above a surface to enable a user to easily engage the wireless electronic device 12 with the cradle 16. The base charger 18 may be further configured to provide electric charge to the wireless electronic device 12 during a charging stage to recharge the rechargeable power supply 17 of the wireless electronic device 12. Also, the base charger 18 may include a power cord (not shown) that can be plugged into an electrical outlet, allowing power to be supplied from the outlet to the charging system 10 for charging the rechargeable power supply 17 of the wireless electronic device 12.

Figure 2:
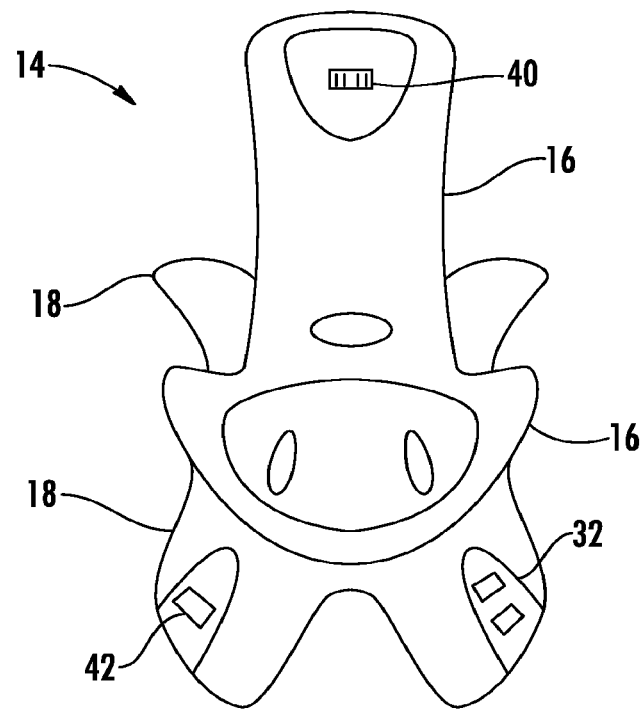
FIG. 2 is a top view of an embodiment of an exemplary recharging device shown in FIG. 1 with an exemplary wireless electronic device out of an exemplary base charger, in accordance with an embodiment of the disclosure.

FIG. 2 is a top view of an embodiment of the recharging device 14 shown in FIG. 1 with the wireless electronic device 12 out of the base charger 18. In addition to the elements described with respect to FIG. 1, the cradle 16 of the recharging device 14 further comprises electrical contacts 40 for communicating with the wireless electronic device 12 when it is properly seated in the cradle 16. The electrical contacts 40 are configured to provide power to the wireless electronic device 12 for recharging the rechargeable power supply 17 in the wireless electronic device 12. In an embodiment, the electrical contacts 40 are also configured to communicate power level (or charge status) information from the wireless electronic device 12 to the recharging device 14, particularly with respect to embodiments in which the recharging device 14 includes the power status indicator 32. In such cases, the recharging device 14 may comprise a power capacity indicator unit that may control (or activate) the power status indicator 32 according to various exemplary conditions. The power status indicator 32 may indicate information, such as power up of the recharging device 14, communication with the wireless electronic device 12, and instant charge pack condition of at least one supercapacitor of the rechargeable power supply 17. Various exemplary implementations of output of the power status indicator 32, under the control of the power capacity indicator unit, for indicating such information are indicated by charts 110 and 120 in FIGS. 8 and 9, respectively. The electrical contacts 40 may also be configured to electrically communicate other signals as needed.

The recharging device 14 may further include a power supply indicator 42 incorporated on the base charger 18. The power supply indicator 42 may be configured to indicate when power is being supplied to the recharging device 14 from the electrical outlet allowing the recharging device 14 to properly charge or recharge the rechargeable power supply 17 of the wireless electronic device 12.

Figure 3:
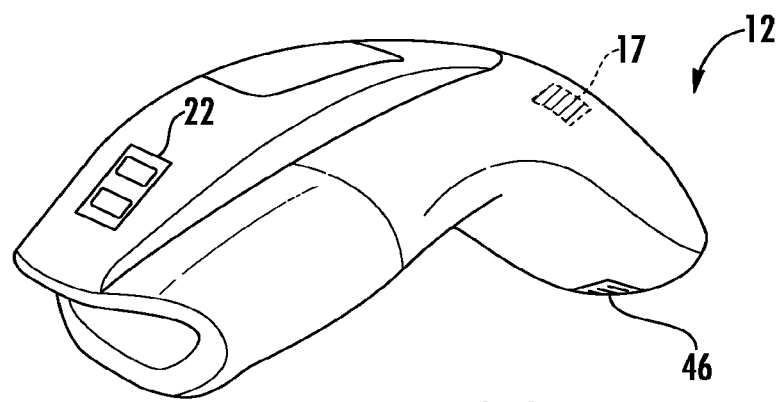
FIG. 3 is a perspective view of an embodiment of an exemplary wireless electronic device shown in FIG. 1, in accordance with an embodiment of the disclosure.

FIG. 3 is a perspective view of an embodiment of the wireless electronic device 12 shown in FIG. 1. For example, the wireless electronic device 12 may be a wireless barcode scanner. In addition to the features shown and described with respect to FIG. 1, the wireless electronic device 12 may further include contacts 46 configured for making electrical connection with the electrical contacts 40 of the cradle 16 (FIG. 2). Therefore, when the wireless electronic device 12 is properly seated or nested on the cradle 16, the contacts 46 are configured to touch the electrical contacts 40 of the cradle 16. As mentioned above, when the contacts 40, 46 are connected, electrical power can be provided to the rechargeable power supply 17 as needed for charging or recharging the rechargeable power supply 17. Also, other communication signals may be shared between the wireless electronic device 12 and the recharging device 14 via the contacts 40, 46.

According to one implementation, the charging system 10 (FIGS. 1-3) comprises a handheld electronic device (e.g., wireless electronic device 12) having a rechargeable power supply 17. The charging system 10 also includes a base charger (e.g. the base charger 18) or a recharging device (e.g. the recharging device 14) configured to support the handheld electronic device during a charging stage. A power indicator (e.g., one or both of power indicators 22, 32) may provide one or more of a visual feedback, an audio feedback, a tactile feedback, or a combination thereof. The base charger is configured to provide electric charge to the handheld electronic device during the charging stage to recharge the rechargeable power supply 17 of the handheld electronic device. A power capacity control unit (e.g. the power capacity control unit 70 (FIG. 5)), incorporated in the handheld electronic device, may include a power sensor for sensing the power level of the rechargeable power supply 17. The power capacity control unit may comprise a detection device (e.g., power level comparing unit 76 (FIG. 5)) configured to compare the detected power level of the rechargeable power supply 17 with a plurality of predetermined power threshold levels in order to determine one of a plurality of predetermined power threshold ranges of the rechargeable power supply 17.

In some embodiments, the handheld electronic device may include a power status indicator 22 for indicating the power status of the rechargeable power supply 17 when the handheld electronic device is detected to be out of the base charger and in the idle state for a predetermined idle threshold, and the detection of the power level of the rechargeable power supply 17 is within at least one predetermined power threshold range. Various exemplary implementations of output of the power status indicator 22 and 32, under the control of a power capacity indicator unit, for indicating power status information are indicated by charts 90 to 120 in FIGS. 6 to 9.

In some embodiments, the power status indicator 22 is incorporated in the handheld electronic device. In another embodiment, the power status indicator 32 is incorporated in the base charger (e.g., recharging device 14). Specifically, the rechargeable power supply 17 may include at least one supercapacitor. The handheld electronic device may be a wireless barcode scanner. The structure and functionality of the power capacity control unit in the handheld electronic device is similar to the power capacity control unit 70 described in detail in FIG. 5.

Figure 4:
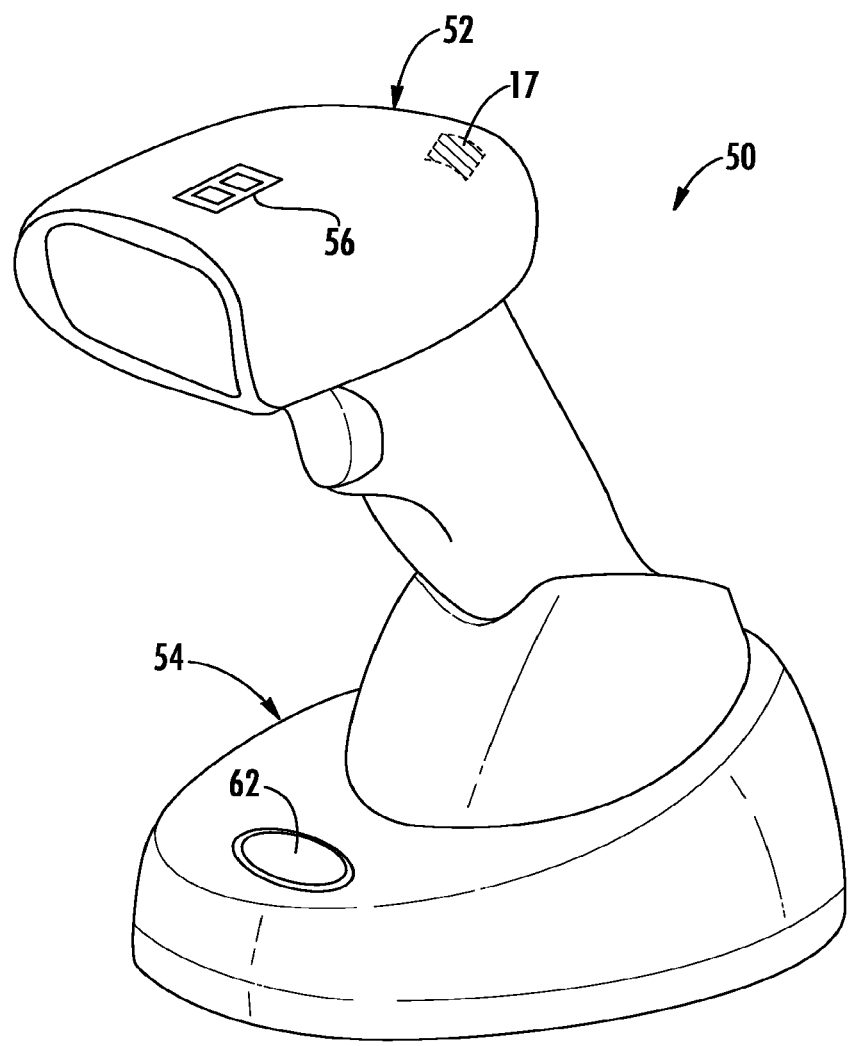
FIG. 4 is a perspective view of a second embodiment of an exemplary charging system shown in FIG. 1, in accordance with an embodiment of the disclosure.

FIG. 4 is a perspective view of a second embodiment of a charging system 50. In this embodiment, the charging system 50 includes a wireless electronic device 52 and a recharging device 54. The wireless electronic device 52 may be a handheld device, such as a wireless barcode scanner or laser scanner. In other embodiments, the wireless electronic device 52 may include other types of portable devices, such as wireless landline telephones, electric razors, calculators, flashlights, etc.

The recharging device 54 in the embodiment of FIG. 4 includes a base charger that acts as a cradle for supporting the wireless electronic device 52 during charging. The recharging device 54 may be designed to support the wireless electronic device 52 and may include electrical contacts (not shown) for making electrical connection with the wireless electronic device 52. In this manner, electrical power can be provided to the wireless electronic device 52 from the recharging device 54 to charge or recharge a rechargeable power supply 17. In an embodiment, the rechargeable power supply 17 may be attached externally to the wireless electronic device 52. In another embodiment, the rechargeable power supply 17 may be disposed inside a housing of the wireless electronic device 52. The rechargeable power supply 17 may include one or more super capacitors.

In some embodiments, the wireless electronic device 52 may include a power status indicator 56 for indicating the power status of the rechargeable power supply 17 when the wireless electronic device 52 is detected to be out of the base charger and in the idle state for a predetermined idle threshold, and the detection of the power level of the rechargeable power supply 17 is within at least one predetermined power threshold range.

One embodiment may include incorporating the power status indicator 56 only on the wireless electronic device 52. A second embodiment may include incorporating the power status indicator 62 only on the recharging device 54. A third embodiment may include incorporating the two power status indicators 56, 62 on both the wireless electronic device 52 and recharging device 54, respectively. Various exemplary implementations of output of the power status indicator 56 and 62, under the control of a power capacity indicator unit, for indicating power status information are indicated by charts 90 to 120 in FIGS. 6 to 9.

In an embodiment, the power status indicator 56 on incorporated on the wireless electronic device 52 may primarily include two color coding indicators, such as RED and YELLOW indicators, to provide an intuitive indication of "bad" status (near depletion) and "caution" status (ready to scan but not fully charged). The RED and the YELLOW indicators may be in a default-on mode. The wireless electronic device 52 may further include a GREEN indicator to provide an intuitive indication of "go" status (fully charged). The GREEN indicator may be in a default-off mode.

According to the embodiment of FIG. 4, the recharging device 54 may be configured to support the wireless electronic device 52 in an upright manner. Also, the recharging device 54 may include a power chord (not shown) that can be plugged into an electrical outlet, allowing power to be supplied from the outlet to the charging system 50 for charging the rechargeable power supply 17 of the wireless electronic device 52.

The power status indicator 62 may be built into an oval page button that may be used for paging the wireless electronic device 52. The oval page button may include an opaque or semi-opaque material through which light from one or more indicators may be diffused. One side (e.g., the left side) of the oval page button may comprise the power status indicator 62, which may include one or more colored visual indicators underneath the opaque or semi-opaque material. The user may perceive the color change when one or the other of the indicators is illuminated, but may not necessarily notice the change in the location of the indicators underneath the button. In some embodiments, the other side (e.g., the right side) of the oval page button may include additional indicator (e.g., a RED LED) used for other indications, such as a "power on" indication or a paging operation.

Figure 5:
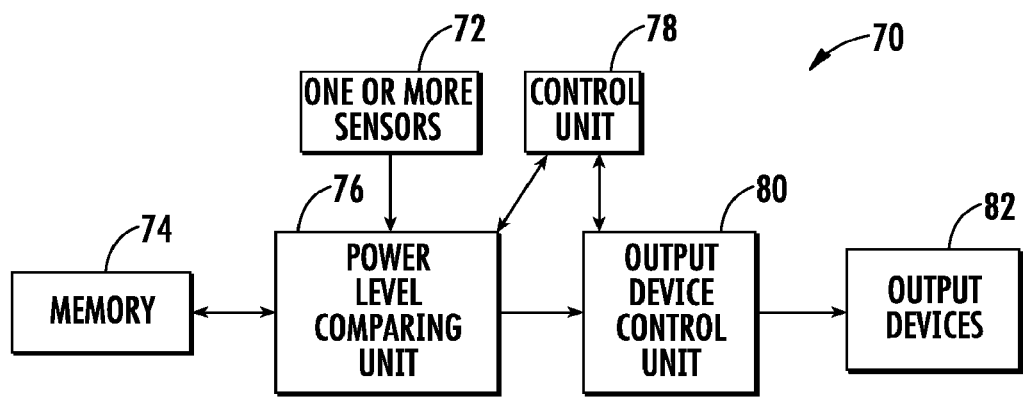
FIG. 5 is a block diagram illustrating an embodiment of an exemplary power capacity indicator unit, in accordance with an embodiment of the disclosure.

FIG. 5 is a block diagram illustrating an embodiment of a power capacity indicator unit 70. In an embodiment, the power capacity indicator unit 70 of FIG. 5 may be incorporated in the wireless electronic device 12. According to some embodiments, portions of the power capacity indicator unit 70 may be incorporated in the wireless electronic device 12 while other portions of the power capacity indicator unit 70 may be incorporated in the recharging device 14. In such cases, the various distributed portions of the power capacity indicator unit 70 may be communicatively coupled with each other via one or more wireless communication protocols.

In this embodiment, the power capacity indicator unit 70 may include one or more sensors 72, a memory 74, a power level comparing unit 76, a control unit 78, an output device control unit 80, and output devices 82 (i.e. power status indicators). In an embodiment, the one or more sensors 72 may be configured to detect that the wireless electronic device 12 is out of the base charger 18 of the recharging device 14, i.e. not in contact with the recharging device 14. The one or more sensors 72 may be further configured to detect that the wireless electronic device 12 is in idle state for a predetermined idle threshold, for example 5 seconds. The one or more sensors 72 may further include, for example a power sensor, configured for detecting when the stored power level of the rechargeable power supply 17 is within at least one predetermined power threshold range. The control unit 78 may be configured to poll data from the one or more sensors 72 after regular time intervals. At any instant, when the poll data indicates that the wireless electronic device 12 is out of the base charger 18 and the wireless electronic device 12 is in idle state for a predetermined idle threshold, the control unit 78 may receive the power level of the rechargeable power supply 17 detected by the power sensor. The power level comparing unit 76, in conjunction with the control unit 78, is configured to compare the power level detected by the one or more sensors 72 (when it is detected that the wireless electronic device 12 is out of the base charger 18 and the wireless electronic device 12 is in idle state for the predetermined idle threshold) with the various predetermined power threshold levels, such as "10%", "30%", and "50%, stored in the memory 74. In an embodiment, based on the comparison, the power level comparing unit 76 may be configured to determine one of multiple different power threshold ranges within which the detected power level lies. In various exemplary embodiments, the at least one predetermined power threshold ranges may primarily correspond to a first range (such as "10%" charge left) designating a "near depletion" status or a second range (such as "50%" charge left) designating a "ready to use but not fully charged" status. In additional embodiment, the at least one predetermined power threshold ranges may further correspond to a third range (such as "down to 50%") designating a "fully charged" status. In an embodiment, the second range is configurable to include at least an upper sub-range (such as "50%" charge left), and a lower sub-range (such as "30%" charge left).

In an embodiment, the control unit 78 may be further configured to set the activation of the at least one power status indicator in a default-on mode for the first range, a default-on mode for the lower sub-range of the second range, and a default-off mode for upper sub-range of the second range.

In an embodiment, the control unit 78, in response to the information provided by the one or more sensors 72 and the power level comparing unit 76, may be configured to determine charge pack status information of the one or more super capacitors in the rechargeable power supply 17. Accordingly, the control unit 78, in conjunction with the output device control unit 80, may be configured to control the output devices 82 to activate a power status indicator, such as the power status indicators 22, corresponding to the predetermined power threshold range to indicate the detected charge pack status information to the user. The output devices 82 may include the one or more power status indicators. The one or more power status indicators may provide one or more of a visual feedback, an audio feedback, or a tactile feedback. The activation of the one or more power status indicators may correspond to switching a power status indicator on and off in a predefined pattern to indicate the predetermined power threshold range of the rechargeable power supply 17. For example, the control unit 78 may be configured to switch a power status indicator (e.g. a RED LED) on and off in a predefined pattern (e.g. 3 sets of flashes) to indicate the first range of the rechargeable power supply 17.

In an embodiment, the output device control unit 80 may be configured to select the one or more power status indicators, such as the power status indicator 22 incorporated on housing of the wireless electronic device 12 and/or the power status indicator 32 incorporated on housing of the base charger 18, for the activation by the control unit 78 in accordance with detected power level of the rechargeable power supply 17 within the first range or the second range. The selected one or more power status indicators may be light emitting diodes of predefined colors. Various possible implementations for activation of power indicators on the wireless electronic device 12 and the recharging device 14 have been described in detail in FIGS. 6 to 9.

Thus, the detected charge pack status information is indicated to the user by activating the power status indicators 22, when the one or more sensors 72 detect that the wireless electronic device 12 is out of the base charger 18 and the wireless electronic device 12 is in the idle state for the predetermined idle threshold. Accordingly, the activation of the power status indicators 22 and/or 32 (such as a series of beeps and flashes) post the predetermined idle threshold prevents the user from confusing a power status indication for a "good scan" or "bad scan" indicator and vice versa. In other words, in accordance with the disclosure, the activation of the power status indicators 22 and/or 32 (such as a series of beeps and flashes) post the predetermined idle threshold does not confuse the user while the user is actively scanning (e.g. the user does not consider such series of beeps and flashes for a scan error while scanning). Therefore, to prevent any confusion for the user, the power status indicators 22 and/or 32 are only activated when the wireless electronic device 12 is idle and the user is not actively using the wireless electronic device 12. Thus, the power status indicator 22 is activated, for example an alert is sounded, after the predetermined idle threshold, i.e. when the user is not performing the scanning operation. For example, in case the predetermined idle threshold is configured to be "10 seconds" based on scanning of a configuration barcode, the power status indicator 22, for example a RED LED, is activated after "10 seconds" when the power level of the rechargeable power supply 17 is detected by the power sensor to be in the first range designating a "near depletion" status. Exemplary implementations of output of the output devices 82 for indicating the charge pack status information of one or more super capacitors in the rechargeable power supply 17 are indicated by chart 90 in FIG. 6.

In another embodiment, the control unit 78, in conjunction with the output device control unit 80, may be configured to control the output devices 82 to indicate the status information of the wireless electronic device 12 and the recharging device 14 to the user. Exemplary implementations of output of the output devices 82 for indicating the status information of the wireless electronic device 12 in conjunction with the recharging device 14 are indicated by chart 100 in FIG. 7. In yet other embodiments, the output device control unit 80, based on configuration barcodes, may customize the LEDs in the power status indicator 22 to flash in different patterns when the power level of the wireless electronic device 12 is below a threshold, as determined by the power level comparing unit 76. Such low power alerts may be generated when the wireless electronic device 12 scans such configuration barcodes to customize the settings for the power level range to be configured, number of flashes per alert, intervals between successive flashes, number of alerts, and interval between successive alerts. The output device control unit 80 may further control additional audio indicators to be set to silent, or to sound with flash patterns.

Various exemplary barcodes have been illustrated in FIGS. 5A-A to 5A-H, which may be scanned by the wireless electronic device 12 for setting various types of low power alerts. For example, the configuration barcode illustrated in FIG. 5A-A may correspond to setting a power level range that may trigger a default low power alert (i.e. 10-30%).

The configuration barcode illustrated in FIG. 5A-B may correspond to setting a power level range that may trigger a different default low power alert (i.e. 10-50%).

The configuration barcode illustrated in FIG. 5A-C may correspond to programming of the LEDs in the power status indicator 22 to flash up to 9 times for the low power alert. In case the configuration barcode illustrated in FIG. 5A-G or 5A-H is already scanned, a double beep may sound with each flash. To set the number of low power flashes, the configuration barcode illustrated in FIG. 5A-C may be scanned by the wireless electronic device 12 and followed by scanning of a digit (1-9) barcode from a programming chart, and thereafter saved. Accordingly, three flashes may be set by default.

The configuration barcode illustrated in FIG. 5A-D may correspond to setting the length of time in seconds between the LED flashes for a low power alert. To set the length of time, the configuration barcode illustrated in FIG. 5A-D may be scanned by the wireless electronic device 12 and followed by scanning of a digit (1-9) barcode from a programming chart, and thereafter saved. Accordingly, interval of two seconds may be set by default.

The configuration barcode illustrated in FIG. 5A-E may correspond to setting the number of times the user wants the low power flash pattern to be repeated. To set the number, the configuration barcode illustrated in FIG. 5A-D may be scanned by the wireless electronic device 12 and followed by scanning of a digit (1-5) barcode from a programming chart, and thereafter saved. Accordingly, the number of times of repetition of the low power flash may be set to "1" by default.

The configuration barcode illustrated in FIG. 5A-F may correspond to setting the length of times in seconds between the low power alerts, when the configuration barcode illustrated in FIG. 5A-E is already scanned and the low power alert repeat is set to more than "1". To set the interval, the configuration barcode illustrated in FIG. 5A-D may be scanned by the wireless electronic device 12 and followed by scanning of a digit (10-120) barcode from a programming chart, and thereafter saved. Accordingly, the length of time between the low power alerts may be set to "10 seconds" by default.

The configuration barcodes in FIGS. 5A-G and 5A-H may correspond to setting the audio indicators, such as beepers, to silent mode for a low power alert. Accordingly, the configuration barcodes in FIGS. 5A-G and 5A-H may be scanned by the wireless electronic device 12. Any low power alert settings will still flash the LEDs whether or not the audio indicators sound. Accordingly, the low power alert beep is set to "OFF" (based on scanning of configuration barcode illustrated in FIG. 5A-G) or "ON" (based on scanning of configuration barcode illustrated in FIG. 5A-H).

The output devices 82 may include visual and/or audible indicating devices. For example, the output devices 82 may include multiple LEDs for visually indicating the information, such as the power status, the status information, or the charge pack status information. In an exemplary embodiment, to indicate the power status, a RED LED may provide intuitive indication of a power level nearing depletion, a YELLOW LED may provide intuitive indication of a power level which is ready to scan but not fully charged), and a GREEN LED to provide an intuitive indication of a power level fully charged. As described above, the one or more power status indicators corresponding to the predetermined power threshold range are activated when the wireless electronic device 12 is detected to be out of the base charger 18 and the idle state of the wireless electronic device 12 for the predetermined idle threshold, and the detection of the power level of the rechargeable power supply 17 within the predetermined power threshold range. Various possible implementations for activation of power indicators on the wireless electronic device 12 and the recharging device 14 have been described in detail in FIGS. 6 to 9.

According to one embodiment, the power capacity indicator unit 70 may include a power sensing device (e.g., one or more sensors 72) configured to detect the power level of a rechargeable power supply 17 when the one or more sensors 72 detect that the wireless electronic device 12 is out of the base charger 18 and the wireless electronic device 12 is in idle state for the predetermined idle threshold. The power capacity indicator unit 70 may further include a detection device (e.g., power level comparing unit 76) configured to compare the detected power level with a plurality of predetermined levels in order to determine one of a plurality of predetermined power threshold ranges of the rechargeable power supply 17. The power capacity indicator unit 70 also includes the output devices 82, such as colored LEDs. The output device control unit 80 may be further controlled by the control unit 78 to activate switching the colored LEDs on and off in a predefined pattern to indicate the predetermined power threshold range of the rechargeable power supply 17.

Furthermore, the rechargeable power supply 17 may include at least one supercapacitor and may be incorporated in a wireless barcode scanner. The power capacity indicator unit 70 may additionally or alternatively be incorporated in a cradle (e.g., recharging device 14) that is configured to support the wireless barcode scanner during a charging process, wherein the cradle may be further configured to provide electric charge to the wireless barcode scanner during the charging process to recharge the supercapacitor of the wireless barcode scanner.

In addition, the switching circuit (e.g., in the output device control unit 80), under the control of the control unit 78, may be configured to switch a predefined power status indicator, for example a RED LED, in a predefined pattern when the base charger 18 is not charging the rechargeable power supply 17 or when the wireless electronic device 12 is not properly supported by the base charger 18. The switching circuit may also be configured to switch to a predefined power status indicator, in another predefined pattern, such as rapid on/off, when the power sensing device or detection device (e.g. e.g., the power level comparing unit 76) detects at least one of a charging error or a condition in which the charging has been suspended.

In another embodiment, the power capacity indicator unit 70 of FIG. 5 may represent an embodiment of the power status indicator 32 incorporated on the recharging device 14. According to some embodiments, portions of the power capacity indicator unit 70 may be incorporated in the recharging device 14 while other portions of the power capacity indicator unit 70 may be incorporated in the wireless electronic device 12.

In an embodiment, the output device control unit 80 may be configured to control the output devices 82 (i.e. the visual and/or audio indicators in the power status indicator 32) to indicate the status information of the recharging device 14 to the user.

The power status indicator 32 may include colored indicators to indicate the status information of the recharging device 14, verify the communication between the recharging device 14 and a host system (now shown), and indicate instant charge pack status information of the wireless electronic device 12.

In an embodiment, the output device control unit 80, based on communication status information provided by the one or more sensors 72, may be configured to control the output devices 82 to indicate the communication status information and scanning status between the wireless electronic device 12 and the recharging device 14 to the user. Exemplary implementations of output of the output devices 82 for indicating the communication status information and scanning status between the wireless electronic device 12 and the recharging device 14 are indicated by chart 110 in FIG. 8.

In another embodiment, the output device control unit 80, based on the charge pack status information provided by the control unit 78, may be configured to control the output devices 82 to indicate the progress when charging, when the wireless electronic device 12 resides in the recharging device 14. Exemplary implementations of output of the output devices 82 for indicating the charge pack status information are indicated by chart 120 in FIG. 9.

Various exemplary barcodes have been illustrated in FIGS. 5B-A to 5B-F, which may be scanned by the wireless electronic device 12 for setting various configuration settings for the recharging device 14.

For example, the configuration barcodes in FIGS. 5B-A and 5B-B may correspond to display a power communication indicator on the recharging device 14. The configuration barcode illustrated in FIG. 5B-A may be scanned by the wireless electronic device 12 to turn "ON" the power communication indicator on the recharging device 14. Alternatively, the configuration barcode illustrated in FIG. 5B-B may be scanned by the wireless electronic device 12 to turn "OFF" the power communication indicator on the recharging device 14.

The configuration barcode illustrated in FIG. 5B-C may correspond to causing the wireless electronic device 12 to reboot and relink with the recharging device 14. To cause the wireless electronic device 12 to reboot and relink with the recharging device 14, the configuration barcode illustrated in FIG. 5B-C may be scanned by the wireless electronic device 12.

The configuration barcodes in FIGS. 5B-D, 5B-E, and 5B-F, may correspond to setting various power modes of the recharging device 14. When the recharging device 14 has both an external power supply and a host interface cable, the recharging device 14 may draw power from the external power supply. When the recharging device 14 does not have an external power supply, the recharging device 14 draws power from the interface cable. However, the rechargeable power supply 17 in the wireless electronic device 12 charges slowly from the host interface cable than if auxiliary power is available. Based on the configuration barcodes in FIGS. 5B-D, 5B-E, and 5B-F, the user may specify whether the rechargeable power supply 17 in the wireless electronic device 12 charges from the host interface cable. If the wireless electronic device 12 scans the configuration barcode illustrated in FIG. 5B-D, the rechargeable power supply 17 does not powers up when the wireless electronic device 12 is in the cradle 16. If the wireless electronic device 12 scans the configuration barcode illustrated in FIG. 5B-E, the rechargeable power supply 17 powers up from the power supply powering the recharging device 14. If there is no power supply powering the recharging device 14, the rechargeable power supply 17 powers up from the interface cable. If the wireless electronic device 12 scans the configuration barcode illustrated in FIG. 5B-F, the rechargeable power supply 17 powers up only from the external power supply powering the recharging device 14. In case there is no external power supply, the rechargeable power supply 17 does not power up.

FIG. 6 is a diagram of a chart 90 showing implementations of output of the output devices 82 for indicating the charge pack status information of one or more super capacitors in the rechargeable power supply 17. The chart 90 defines the signals that may be provided by the output control unit 80 for controlling the illumination of the output devices 82 (e.g., LEDs in the power status indicator 22). In this embodiment, the indicators or output devices 82 include a predefined pattern of a predefined LED, such as three sets of flashes of YELLOW LED and three sets of flashes of RED LED. According to other embodiments, the indicators or output devices 82 include other LEDs of other patterns.

According to the chart 90 of FIG. 6, the output device control unit 80 is configured to control the LEDs in the predefined patterns depending on the detected status information when the one or more sensors 72 detect that the wireless electronic device 12 is out of the base charger 18 and the wireless electronic device 12 is in idle state for the predetermined idle threshold. For example, when the power level of the rechargeable power supply 17 is "30%", the YELLOW LED generates three sets of flashes, and additional audio indicators generate two short beeps per flash. According to this status, the approximate expected count of scans of the wireless electronic device 12 may be "100". In another example, when the power level of the rechargeable power supply 17 is "10%", the RED LED generates three sets of flashes and additional audio indicators generate two short beeps per flash. According to this status, the approximate expected count of scans of the wireless electronic device 12 may be "50".

FIG. 7 is a diagram of a chart 100 showing implementations of output of the output devices 82 for indicating the status information by the power capacity indicator unit 70 in the base charger 18 of the recharging device 14. The chart 100 defines the signals that may be provided by the output control unit 80 for controlling the illumination of the output devices 82 (e.g., LEDs as the power status indicator 32). In this embodiment, the indicators or output devices 82 include a predefined pattern of a predefined LED, such as a single flash of RED LED and a blinking RED LED. According to other embodiments, the indicators or output devices 82 include other LEDs of other patterns.

According to the chart 100 of FIG. 7, the output device control unit 80 is configured to control the LEDs in the predefined patterns depending on the detected status information of the recharging device 14. For example, during normal operation, when the power level of the rechargeable power supply 17 is below a threshold value, the RED LED generates one flash without any beep. In another example, when the communication between the wireless electronic device 12 and the recharging device 14 is successful, the GREEN LED generates single flash and additional audio indicators generate one beeps. In yet another example, during a menu operation, when the menu change is successful, the GREEN LED generates single flash and additional audio indicators generate two beeps.

Figure 8:
FIG. 8 is a diagram of a chart showing implementations of output of exemplary output devices for indicating the communication status information and scanning status between an exemplary wireless electronic device and an exemplary recharging device shown in FIG. 1, in accordance with an embodiment of the disclosure.

FIG. 8 is a diagram of a chart 110 showing implementations of output of the output devices 82 for indicating the communication status information and scanning status between the wireless electronic device 12 and the recharging device 14. The chart 110 defines the signals that may be provided by the output control unit 80 in the power capacity indicator unit 70 in the base charger 18 for controlling the illumination of the output devices 82 (e.g., LEDs in the power status indicator 32). In this embodiment, the indicators or output devices 82 include a predefined pattern of a predefined LED, such as a single flash of RED LED and a blinking RED LED. According to other embodiments, the indicators or output devices 82 include other LEDs of other patterns.

FIG. 9 is a diagram of a chart 120 showing implementations of output of the output devices 82 for indicating the charge pack status information by the power capacity indicator unit 70 in the base charger 18. The chart 120 defines the signals that may be provided by the output control unit 80 for controlling the illumination of the output devices 82 (e.g., LEDs in the power status indicator 32). In this embodiment, the indicators or output devices 82 include a predefined pattern of a predefined LED. According to other embodiments, the indicators or output devices 82 include other LEDs of other patterns.

According to the chart 120 of FIG. 9, the output device control unit 80 is configured to control the LEDs in the predefined patterns when the wireless electronic device 12 resides in the recharging device 14 for charging. For example, when the power level of the rechargeable power supply 17 is "100%", the solid GREEN LED is activated continuously (without flashing). According to this status, the approximate expected count of scans of the wireless electronic device 12 may be "450".

EXEMPLARY EMBODIMENTS

A1. A wireless electronic device, comprising:
a rechargeable power supply;
a power capacity indicator unit comprising:
a power status indicator; and
one or more sensors for:
    detecting a power level of the rechargeable power supply; and
    detecting that the wireless electronic device is not on a base charger for charging the rechargeable power supply;
wherein the power capacity indicator unit is configured to:
determine if the power level of the rechargeable power supply is within a predetermined power threshold range;
determine if the wireless electronic device has been idle for a predetermined idle threshold; and
if the wireless electronic device is not on the base charger, the wireless electronic device has been idle for the predetermined idle threshold, and the power level of the rechargeable power supply is within the predetermined power threshold range, activate the power status indicator.

A2. The wireless electronic device of embodiment A1, the rechargeable power supply comprises a supercapacitor.

A3. The wireless electronic device of embodiments A1 and/or A2, wherein the wireless electronic device is a barcode scanner.

A4. The wireless electronic device of embodiments A1, A2, and/or A3, wherein the predetermined idle threshold is configurable.

A5. The wireless electronic device of embodiments A1, A2, A3, and/or A4, wherein the power status indicator comprises an LED.

A6. The wireless electronic device of embodiments A1, A2, A3, A4, and/or A5, wherein the power status indicator comprises an audio indicator.

A7. The wireless electronic device of embodiments A1, A2, A3, A4, A5, and/or A6, wherein:
the power status indicator comprises:
a first LED;
a second LED having a different color from the first LED;
an audio indicator; and
the power capacity indicator unit is configured to:
determine if the power level of the rechargeable power supply is within a first predetermined power range or a second predetermined power range; and
if the wireless electronic device is not on the base charger, the wireless electronic device has been idle for the predetermined idle threshold, and the power level of the rechargeable power supply is within the first predetermined power range, activate the first LED and the audio indicator; and
if the wireless electronic device is not on the base charger, the wireless electronic device has been idle for the predetermined idle threshold, and the power level of the rechargeable power supply is within the second predetermined power range, activate the second LED and the audio indicator.

A8. The wireless electronic device of embodiment A7, wherein:
the power status indicator comprises a third LED having a different color from the first LED and the second LED; and the power capacity indicator unit is configured to:
determine if the power level of the rechargeable power supply is within a third predetermined power range; and
if the wireless electronic device is not on the base charger, the wireless electronic device has been idle for the predetermined idle threshold, and the power level of the rechargeable power supply is within the third predetermined power range, activate the third LED and the audio indicator.

A9. The wireless electronic device of embodiments A7 and/or A8, wherein the audio indicator beeps twice when activated.

A10. The wireless electronic device of embodiments A7, A8, and/or A9, wherein:
the first LED is yellow; and
the second LED is red.

A11. The wireless electronic device of embodiments A8 and/or A9, wherein:
the first LED is yellow;
the second LED is red; and
the third LED is green.

To supplement the present disclosure, this application incorporates entirely by reference the following commonly assigned patents, patent application publications, and patent applications:

U.S. Pat. Nos. 6,832,725; 7,128,266; 7,159,783; 7,413,127; 7,726,575; 8,294,969; 8,317,105; 8,322,622; 8,366,005; 8,371,507; 8,376,233; 8,381,979; 8,390,909; 8,408,464; 8,408,468; 8,408,469; 8,424,768; 8,448,863; 8,457,013; 8,459,557; 8,469,272; 8,474,712; 8,479,992; 8,490,877; 8,517,271; 8,523,076; 8,528,818; 8,544,737; 8,548,242; 8,548,420; 8,550,335; 8,550,354; 8,550,357; 8,556,174; 8,556,176; 8,556,177; 8,559,767; 8,599,957; 8,561,895; 8,561,903; 8,561,905; 8,565,107; 8,571,307; 8,579,200; 8,583,924; 8,584,945; 8,587,595; 8,587,697; 8,588,869; 8,590,789; 8,596,539; 8,596,542; 8,596,543; 8,599,271; 8,599,957; 8,600,158; 8,600,167; 8,602,309; 8,608,053; 8,608,071; 8,611,309; 8,615,487; 8,616,454; 8,621,123; 8,622,303; 8,628,013; 8,628,015; 8,628,016; 8,629,926; 8,630,491; 8,635,309; 8,636,200; 8,636,212; 8,636,215; 8,636,224; 8,638,806; 8,640,958; 8,640,960; 8,643,717; 8,646,692; 8,646,694; 8,657,200; 8,659,397; 8,668,149; 8,678,285; 8,678,286; 8,682,077; 8,687,282; 8,692,927; 8,695,880; 8,698,949; 8,717,494; 8,717,494; 8,720,783; 8,723,804; 8,723,904; 8,727,223; 8,740,082; 8,740,085; 8,746,563; 8,750,445; 8,752,766; 8,756,059; 8,757,495; 8,760,563; 8,763,909; 8,777,108; 8,777,109; 8,779,898; 8,781,520; 8,783,573; 8,789,757; 8,789,758; 8,789,759; 8,794,520; 8,794,522; 8,794,525; 8,794,526; 8,798,367; 8,807,431; 8,807,432; 8,820,630; 8,822,848; 8,824,692; 8,824,696; 8,842,849; 8,844,822; 8,844,823; 8,849,019; 8,851,383; 8,854,633; 8,866,963; 8,868,421; 8,868,519; 8,868,802; 8,868,803; 8,870,074; 8,879,639; 8,880,426; 8,881,983; 8,881,987; 8,903,172; 8,908,995; 8,910,870; 8,910,875; 8,914,290; 8,914,788; 8,915,439; 8,915,444; 8,916,789; 8,918,250; 8,918,564; 8,925,818; 8,939,374; 8,942,480; 8,944,313; 8,944,327; 8,944,332; 8,950,678; 8,967,468; 8,971,346; 8,976,030; 8,976,368; 8,978,981; 8,978,983; 8,978,984; 8,985,456; 8,985,457; 8,985,459; 8,985,461; 8,988,578; 8,988,590; 8,991,704; 8,996,194; 8,996,384; 9,002,641; 9,007,368; 9,010,641; 9,015,513; 9,016,576; 9,022,288; 9,030,964; 9,033,240; 9,033,242; 9,036,054; 9,037,344; 9,038,911; 9,038,915; 9,047,098; 9,047,359; 9,047,420; 9,047,525; 9,047,531; 9,053,055; 9,053,378; 9,053,380; 9,058,526; 9,064,165; 9,064,165; 9,064,167; 9,064,168; 9,064,254; 9,066,032; 9,070,032; 9,076,459; 9,079,423; 9,080,856; 9,082,023; 9,082,031; 9,084,032; 9,087,250; 9,092,681; 9,092,682; 9,092,683; 9,093,141; 9,098,763; 9,104,929; 9,104,934; 9,107,484; 9,111,159; 9,111,166; 9,135,483; 9,137,009; 9,141,839; 9,147,096; 9,148,474; 9,158,000; 9,158,340; 9,158,953; 9,159,059; 9,165,174; 9,171,543; 9,183,425; 9,189,669; 9,195,844; 9,202,458; 9,208,366; 9,208,367; 9,219,836; 9,224,024; 9,224,027; 9,230,140; 9,235,553; 9,239,950; 9,245,492; 9,248,640; 9,250,652; 9,250,712; 9,251,411; 9,258,033; 9,262,633; 9,262,660; 9,262,662; 9,269,036; 9,270,782; 9,274,812; 9,275,388; 9,277,668; 9,280,693; 9,286,496; 9,298,964; 9,301,427; 9,313,377; 9,317,037; 9,319,548; 9,342,723; 9,361,882; 9,365,381; 9,373,018; 9,375,945; 9,378,403; 9,383,848; 9,384,374; 9,390,304; 9,390,596; 9,411,386; 9,412,242; 9,418,269; 9,418,270; 9,465,967; 9,423,318; 9,424,454; 9,436,860; 9,443,123; 9,443,222; 9,454,689; 9,464,885; 9,465,967; 9,478,983; 9,481,186; 9,487,113; 9,488,986; 9,489,782; 9,490,540; 9,491,729; 9,497,092; 9,507,974; 9,519,814; 9,521,331; 9,530,038; 9,572,901; 9,558,386; 9,606,581; 9,646,189; 9,646,191; 9,652,648; 9,652,653; 9,656,487; 9,659,198; 9,680,282; 9,697,401; 9,701,140; U.S. Design Pat. No. D702,237; U.S. Design Pat. No. D716,285; U.S. Design Pat. No. D723,560; U.S. Design Pat. No. D730,357; U.S. Design Pat. No. D730,901; U.S. Design Pat. No. D730,902; U.S. Design Pat. No. D734,339; U.S. Design Pat. No. D737,321; U.S. Design Pat. No. D754,205; U.S. Design Pat. No. D754,206; U.S. Design Pat. No. D757,009; U.S. Design Pat. No. D760,719; U.S. Design Pat. No. D762,604; U.S. Design Pat. No. D766,244; U.S. Design Pat. No. D777,166; U.S. Design Pat. No. D771,631; U.S. Design Pat. No. D783,601; U.S. Design Pat. No. D785,617; U.S. Design Pat. No. D785,636; U.S. Design Pat. No. D790,505; U.S. Design Pat. No. D790,546; International Publication No. 2013/163789; U.S. Patent Application Publication No. 2008/0185432; U.S. Patent Application Publication No. 2009/0134221; U.S. Patent Application Publication No. 2010/0177080; U.S. Patent Application Publication No. 2010/0177076; U.S. Patent Application Publication No. 2010/0177707; U.S. Patent Application Publication No. 2010/0177749; U.S. Patent Application Publication No. 2010/0265880; U.S. Patent Application Publication No. 2011/0202554; U.S. Patent Application Publication No. 2012/0111946; U.S. Patent Application Publication No. 2012/0168511; U.S. Patent Application Publication No. 2012/0168512; U.S. Patent Application Publication No. 2012/0193423; U.S. Patent Application Publication No. 2012/0194692; U.S. Patent Application Publication No. 2012/0203647; U.S. Patent Application Publication No. 2012/0223141; U.S. Patent Application Publication No. 2012/0228382; U.S. Patent Application Publication No. 2012/0248188; U.S. Patent Application Publication No. 2013/0043312; U.S. Patent Application Publication No. 2013/0082104; U.S. Patent Application Publication No. 2013/0175341; U.S. Patent Application Publication No. 2013/0175343; U.S. Patent Application Publication No. 2013/0257744; U.S. Patent Application Publication No. 2013/0257759; U.S. Patent Application Publication No. 2013/0270346; U.S. Patent Application Publication No. 2013/0292475; U.S. Patent Application Publication No. 2013/0292477; U.S. Patent Application Publication No. 2013/0293539; U.S. Patent Application Publication No. 2013/0293540; U.S. Patent Application Publication No. 2013/0306728; U.S. Patent Application Publication No. 2013/0306731; U.S. Patent Application Publication No. 2013/0307964; U.S. Patent Application Publication No. 2013/0308625; U.S.

Patent Application Publication No. 2013/0313324; U.S.
Patent Application Publication No. 2013/0332996; U.S.
Patent Application Publication No. 2014/0001267; U.S.
Patent Application Publication No. 2014/0025584; U.S.
Patent Application Publication No. 2014/0034734; U.S.
Patent Application Publication No. 2014/0036848; U.S.
Patent Application Publication No. 2014/0039693; U.S.
Patent Application Publication No. 2014/0049120; U.S.
Patent Application Publication No. 2014/0049635; U.S.
Patent Application Publication No. 2014/0061306; U.S.
Patent Application Publication No. 2014/0063289; U.S.
Patent Application Publication No. 2014/0066136; U.S.
Patent Application Publication No. 2014/0067692; U.S.
Patent Application Publication No. 2014/0070005; U.S.
Patent Application Publication No. 2014/0071840; U.S.
Patent Application Publication No. 2014/0074746; U.S.
Patent Application Publication No. 2014/0076974; U.S.
Patent Application Publication No. 2014/0097249; U.S.
Patent Application Publication No. 2014/0098792; U.S.
Patent Application Publication No. 2014/0100813; U.S.
Patent Application Publication No. 2014/0103115; U.S.
Patent Application Publication No. 2014/0104413; U.S.
Patent Application Publication No. 2014/0104414; U.S.
Patent Application Publication No. 2014/0104416; U.S.
Patent Application Publication No. 2014/0106725; U.S.
Patent Application Publication No. 2014/0108010; U.S.
Patent Application Publication No. 2014/0108402; U.S.
Patent Application Publication No. 2014/0110485; U.S.
Patent Application Publication No. 2014/0125853; U.S.
Patent Application Publication No. 2014/0125999; U.S.
Patent Application Publication No. 2014/0129378; U.S.
Patent Application Publication No. 2014/0131443; U.S.
Patent Application Publication No. 2014/0133379; U.S.
Patent Application Publication No. 2014/0136208; U.S.
Patent Application Publication No. 2014/0140585; U.S.
Patent Application Publication No. 2014/0152882; U.S.
Patent Application Publication No. 2014/0158770; U.S.
Patent Application Publication No. 2014/0159869; U.S.
Patent Application Publication No. 2014/0166759; U.S.
Patent Application Publication No. 2014/0168787; U.S.
Patent Application Publication No. 2014/0175165; U.S.
Patent Application Publication No. 2014/0191684; U.S.
Patent Application Publication No. 2014/0191913; U.S.
Patent Application Publication No. 2014/0197304; U.S.
Patent Application Publication No. 2014/0214631; U.S.
Patent Application Publication No. 2014/0217166; U.S.
Patent Application Publication No. 2014/0231500; U.S.
Patent Application Publication No. 2014/0247315; U.S.
Patent Application Publication No. 2014/0263493; U.S.
Patent Application Publication No. 2014/0263645; U.S.
Patent Application Publication No. 2014/0270196; U.S.
Patent Application Publication No. 2014/0270229; U.S.
Patent Application Publication No. 2014/0278387; U.S.
Patent Application Publication No. 2014/0288933; U.S.
Patent Application Publication No. 2014/0297058; U.S.
Patent Application Publication No. 2014/0299665; U.S.
Patent Application Publication No. 2014/0332590; U.S.
Patent Application Publication No. 2014/0351317; U.S.
Patent Application Publication No. 2014/0362184; U.S.
Patent Application Publication No. 2014/0363015; U.S.
Patent Application Publication No. 2014/0369511; U.S.
Patent Application Publication No. 2014/0374483; U.S.
Patent Application Publication No. 2014/0374485; U.S.
Patent Application Publication No. 2015/0001301; U.S.
Patent Application Publication No. 2015/0001304; U.S.
Patent Application Publication No. 2015/0009338; U.S.
Patent Application Publication No. 2015/0014416; U.S.
Patent Application Publication No. 2015/0021397; U.S.
Patent Application Publication No. 2015/0028104; U.S.
Patent Application Publication No. 2015/0029002; U.S.
Patent Application Publication No. 2015/0032709; U.S.
Patent Application Publication No. 2015/0039309; U.S.
Patent Application Publication No. 2015/0039878; U.S.
Patent Application Publication No. 2015/0040378; U.S.
Patent Application Publication No. 2015/0049347; U.S.
Patent Application Publication No. 2015/0051992; U.S.
Patent Application Publication No. 2015/0053769; U.S.
Patent Application Publication No. 2015/0062366; U.S.
Patent Application Publication No. 2015/0063215; U.S.
Patent Application Publication No. 2015/0088522; U.S.
Patent Application Publication No. 2015/0096872; U.S.
Patent Application Publication No. 2015/0100196; U.S.
Patent Application Publication No. 2015/0102109; U.S.
Patent Application Publication No. 2015/0115035; U.S.
Patent Application Publication No. 2015/0127791; U.S.
Patent Application Publication No. 2015/0128116; U.S.
Patent Application Publication No. 2015/0133047; U.S.
Patent Application Publication No. 2015/0134470; U.S.
Patent Application Publication No. 2015/0136851; U.S.
Patent Application Publication No. 2015/0142492; U.S.
Patent Application Publication No. 2015/0144692; U.S.
Patent Application Publication No. 2015/0144698; U.S.
Patent Application Publication No. 2015/0149946; U.S.
Patent Application Publication No. 2015/0161429; U.S.
Patent Application Publication No. 2015/0178523; U.S.
Patent Application Publication No. 2015/0178537; U.S.
Patent Application Publication No. 2015/0178685; U.S.
Patent Application Publication No. 2015/0181109; U.S.
Patent Application Publication No. 2015/0199957; U.S.
Patent Application Publication No. 2015/0210199; U.S.
Patent Application Publication No. 2015/0212565; U.S.
Patent Application Publication No. 2015/0213647; U.S.
Patent Application Publication No. 2015/0220753; U.S.
Patent Application Publication No. 2015/0220901; U.S.
Patent Application Publication No. 2015/0227189; U.S.
Patent Application Publication No. 2015/0236984; U.S.
Patent Application Publication No. 2015/0239348; U.S.
Patent Application Publication No. 2015/0242658; U.S.
Patent Application Publication No. 2015/0248572; U.S.
Patent Application Publication No. 2015/0254485; U.S.
Patent Application Publication No. 2015/0261643; U.S.
Patent Application Publication No. 2015/0264624; U.S.
Patent Application Publication No. 2015/0268971; U.S.
Patent Application Publication No. 2015/0269402; U.S.
Patent Application Publication No. 2015/0288689; U.S.
Patent Application Publication No. 2015/0288896; U.S.
Patent Application Publication No. 2015/0310243; U.S.
Patent Application Publication No. 2015/0310244; U.S.
Patent Application Publication No. 2015/0310389; U.S.
Patent Application Publication No. 2015/0312780; U.S.
Patent Application Publication No. 2015/0327012; U.S.
Patent Application Publication No. 2016/0014251; U.S.
Patent Application Publication No. 2016/0025697; U.S.
Patent Application Publication No. 2016/0026838; U.S.
Patent Application Publication No. 2016/0026839; U.S.
Patent Application Publication No. 2016/0040982; U.S.
Patent Application Publication No. 2016/0042241; U.S.
Patent Application Publication No. 2016/0057230; U.S.
Patent Application Publication No. 2016/0062473; U.S.
Patent Application Publication No. 2016/0070944; U.S.
Patent Application Publication No. 2016/0092805; U.S.
Patent Application Publication No. 2016/0101936; U.S.
Patent Application Publication No. 2016/0104019; U.S.
Patent Application Publication No. 2016/0104274; U.S.

Patent Application Publication No. 2016/0109219; U.S.
Patent Application Publication No. 2016/0109220; U.S.
Patent Application Publication No. 2016/0109224; U.S.
Patent Application Publication No. 2016/0112631; U.S.
Patent Application Publication No. 2016/0112643; U.S.
Patent Application Publication No. 2016/0117627; U.S.
Patent Application Publication No. 2016/0124516; U.S.
Patent Application Publication No. 2016/0125217; U.S.
Patent Application Publication No. 2016/0125342; U.S.
Patent Application Publication No. 2016/0125873; U.S.
Patent Application Publication No. 2016/0133253; U.S.
Patent Application Publication No. 2016/0171597; U.S.
Patent Application Publication No. 2016/0171666; U.S.
Patent Application Publication No. 2016/0171720; U.S.
Patent Application Publication No. 2016/0171775; U.S.
Patent Application Publication No. 2016/0171777; U.S.
Patent Application Publication No. 2016/0174674; U.S.
Patent Application Publication No. 2016/0178479; U.S.
Patent Application Publication No. 2016/0178685; U.S.
Patent Application Publication No. 2016/0178707; U.S.
Patent Application Publication No. 2016/0179132; U.S.
Patent Application Publication No. 2016/0179143; U.S.
Patent Application Publication No. 2016/0179368; U.S.
Patent Application Publication No. 2016/0179378; U.S.
Patent Application Publication No. 2016/0180130; U.S.
Patent Application Publication No. 2016/0180133; U.S.
Patent Application Publication No. 2016/0180136; U.S.
Patent Application Publication No. 2016/0180594; U.S.
Patent Application Publication No. 2016/0180663; U.S.
Patent Application Publication No. 2016/0180678; U.S.
Patent Application Publication No. 2016/0180713; U.S.
Patent Application Publication No. 2016/0185136; U.S.
Patent Application Publication No. 2016/0185291; U.S.
Patent Application Publication No. 2016/0186926; U.S.
Patent Application Publication No. 2016/0188861; U.S.
Patent Application Publication No. 2016/0188939; U.S.
Patent Application Publication No. 2016/0188940; U.S.
Patent Application Publication No. 2016/0188941; U.S.
Patent Application Publication No. 2016/0188942; U.S.
Patent Application Publication No. 2016/0188943; U.S.
Patent Application Publication No. 2016/0188944; U.S.
Patent Application Publication No. 2016/0189076; U.S.
Patent Application Publication No. 2016/0189087; U.S.
Patent Application Publication No. 2016/0189088; U.S.
Patent Application Publication No. 2016/0189092; U.S.
Patent Application Publication No. 2016/0189284; U.S.
Patent Application Publication No. 2016/0189288; U.S.
Patent Application Publication No. 2016/0189366; U.S.
Patent Application Publication No. 2016/0189443; U.S.
Patent Application Publication No. 2016/0189447; U.S.
Patent Application Publication No. 2016/0189489; U.S.
Patent Application Publication No. 2016/0192051; U.S.
Patent Application Publication No. 2016/0202951; U.S.
Patent Application Publication No. 2016/0202958; U.S.
Patent Application Publication No. 2016/0202959; U.S.
Patent Application Publication No. 2016/0203021; U.S.
Patent Application Publication No. 2016/0203429; U.S.
Patent Application Publication No. 2016/0203797; U.S.
Patent Application Publication No. 2016/0203820; U.S.
Patent Application Publication No. 2016/0204623; U.S.
Patent Application Publication No. 2016/0204636; U.S.
Patent Application Publication No. 2016/0204638; U.S.
Patent Application Publication No. 2016/0227912; U.S.
Patent Application Publication No. 2016/0232891; U.S.
Patent Application Publication No. 2016/0292477; U.S.
Patent Application Publication No. 2016/0294779; U.S.
Patent Application Publication No. 2016/0306769; U.S.
Patent Application Publication No. 2016/0314276; U.S.
Patent Application Publication No. 2016/0314294; U.S.
Patent Application Publication No. 2016/0316190; U.S.
Patent Application Publication No. 2016/0323310; U.S.
Patent Application Publication No. 2016/0325677; U.S.
Patent Application Publication No. 2016/0327614; U.S.
Patent Application Publication No. 2016/0327930; U.S.
Patent Application Publication No. 2016/0328762; U.S.
Patent Application Publication No. 2016/0330218; U.S.
Patent Application Publication No. 2016/0343163; U.S.
Patent Application Publication No. 2016/0343176; U.S.
Patent Application Publication No. 2016/0364914; U.S.
Patent Application Publication No. 2016/0370220; U.S.
Patent Application Publication No. 2016/0372282; U.S.
Patent Application Publication No. 2016/0373847; U.S.
Patent Application Publication No. 2016/0377414; U.S.
Patent Application Publication No. 2016/0377417; U.S.
Patent Application Publication No. 2017/0010141; U.S.
Patent Application Publication No. 2017/0010328; U.S.
Patent Application Publication No. 2017/0010780; U.S.
Patent Application Publication No. 2017/0016714; U.S.
Patent Application Publication No. 2017/0018094; U.S.
Patent Application Publication No. 2017/0046603; U.S.
Patent Application Publication No. 2017/0047864; U.S.
Patent Application Publication No. 2017/0053146; U.S.
Patent Application Publication No. 2017/0053147; U.S.
Patent Application Publication No. 2017/0053647; U.S.
Patent Application Publication No. 2017/0055606; U.S.
Patent Application Publication No. 2017/0060316; U.S.
Patent Application Publication No. 2017/0061961; U.S.
Patent Application Publication No. 2017/0064634; U.S.
Patent Application Publication No. 2017/0083730; U.S.
Patent Application Publication No. 2017/0091502; U.S.
Patent Application Publication No. 2017/0091706; U.S.
Patent Application Publication No. 2017/0091741; U.S.
Patent Application Publication No. 2017/0091904; U.S.
Patent Application Publication No. 2017/0092908; U.S.
Patent Application Publication No. 2017/0094238; U.S.
Patent Application Publication No. 2017/0098947; U.S.
Patent Application Publication No. 2017/0100949; U.S.
Patent Application Publication No. 2017/0108838; U.S.
Patent Application Publication No. 2017/0108895; U.S.
Patent Application Publication No. 2017/0118355; U.S.
Patent Application Publication No. 2017/0123598; U.S.
Patent Application Publication No. 2017/0124369; U.S.
Patent Application Publication No. 2017/0124396; U.S.
Patent Application Publication No. 2017/0124687; U.S.
Patent Application Publication No. 2017/0126873; U.S.
Patent Application Publication No. 2017/0126904; U.S.
Patent Application Publication No. 2017/0139012; U.S.
Patent Application Publication No. 2017/0140329; U.S.
Patent Application Publication No. 2017/0140731; U.S.
Patent Application Publication No. 2017/0147847; U.S.
Patent Application Publication No. 2017/0150124; U.S.
Patent Application Publication No. 2017/0169198; U.S.
Patent Application Publication No. 2017/0171035; U.S.
Patent Application Publication No. 2017/0171703; U.S.
Patent Application Publication No. 2017/0171803; U.S.
Patent Application Publication No. 2017/0180359; U.S.
Patent Application Publication No. 2017/0180577; U.S.
Patent Application Publication No. 2017/0181299; U.S.
Patent Application Publication No. 2017/0190192; U.S.
Patent Application Publication No. 2017/0193432; U.S.
Patent Application Publication No. 2017/0193461; U.S.
Patent Application Publication No. 2017/0193727; U.S.
Patent Application Publication No. 2017/0199266; U.S.

Patent Application Publication No. 2017/0200108; and U.S. Patent Application Publication No. 2017/0200275.

In the specification and/or figures, typical embodiments of the invention have been disclosed. The present disclosure is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The invention claimed is:

1. A system comprising
a charger unit; and
an electronic device comprising an indicator unit, wherein the indicator unit comprises:
one or more sensors configured to detect when a power level of a battery-free power supply of the electronic device is within at least one predetermined power threshold range; and
a control unit configured to activate at least one power status indicator corresponding to the detected at least one predetermined power threshold range in response to the electronic device being detected to be out of the charger unit and in an idle state for a predetermined idle time threshold.

2. The system of claim 1, wherein the activation of the at least one power status indicator corresponds to operation of the at least one power status indicator in a predefined pattern to indicate that the power level of the battery-free power supply is within the at least one predetermined power threshold range.

3. The system of claim 1, wherein the charger unit comprises a cradle and a base charger, wherein at least one of the cradle and the base charger is configured to:
support the electronic device; and
provide electrical power to the battery-free power supply of the electronic device.

4. The system of claim 3, wherein the base charger is configured to provide the electrical power to the battery-free power supply of the electronic device, via at least one of a cable and a battery.

5. The system of claim 3, wherein the indicator unit is located on the charger unit.

6. The system of claim 3, wherein the cradle includes one or more electrical contacts that are configured to at least:
provide the electrical power to the electronic device; and
communicate the power level of the battery-free power supply to the base charger; and communicate charge status information of the electronic device to the base charger.

7. The system of claim 1, wherein the electronic device is one of: a battery-free scanner, a wireless battery-free scanner, a wireless barcode scanner, and a laser barcode scanner.

8. The system of claim 1, wherein the at least one predetermined power threshold range corresponds to one of: a first range designating a near depletion status, a second range designating a ready to use but not fully charged status, or a third range designating a fully charged status.

9. The system of claim 1, wherein the at least one power status indicator provides a visual feedback, an audio feedback, and/or a tactile feedback.

10. The system of claim 1, wherein the control unit is configured to activate a first predefined power status indicator in a predefined pattern in an instance in which the electronic device is not supported on the charger unit.

11. An indicator unit comprising:
at least one sensor configured to:
detect that an electronic device is out of a charger and is in an idle state for a predetermined idle threshold; and
detect a power level of a battery-free power supply of the electronic device to be within a predetermined power threshold range; and
at least one power status indicator configured to indicate an alert indicating the power level is within the predetermined power threshold range in response to the electronic device being detected to be out of the charger and in the idle state for the predetermined idle threshold.

12. The indicator unit of claim 11, wherein the battery-free power supply includes at least one supercapacitor.

13. The indicator unit of claim 11, wherein the indicator unit is configured to provide real-time charge status of the electronic device when the battery-free power supply of the electronic device is being charged.

14. The indicator unit of claim 11, wherein the indicator unit is programmable to match an operational need of a user of the electronic device and wherein the indicator unit is programmable based on scanning a configuration indicia by the electronic device.

15. The indicator unit of claim 11, wherein the indicator unit is adapted to provide an indication of powering up of the battery-free power supply of the electronic device, an instant charge pack condition of the battery-free power supply of the electronic device, and/or a communication between the electronic device and a host device.

16. A method comprising,
detecting an electronic device to be out of a charger and in an idle state for a predetermined idle threshold;
determining a power level of a battery-free power supply to be within at least one predetermined power threshold range; and
in response to the electronic device being detected to be out of the charger and in the idle state for the predetermined idle threshold, activating at least one power status indicator, wherein the at least one power status indicator corresponds to the detected at least one predetermined power threshold range.

17. The method of claim 16, wherein the activation of the at least one power status indicator corresponds to operating the at least one power status indicator in a predefined pattern to indicate that the power level of the battery-free power supply is within the at least one predetermined power threshold range.

18. The method of claim 16, wherein the electronic device is a wireless barcode scanner and the battery-free power supply is a supercapacitor based rechargeable power supply.

19. The method of claim 16, wherein the at least one predetermined power threshold range corresponds to one of: a first range designating a near depletion status, a second range designating a ready to use but not fully charged status, or a third range designating a fully charged status.

20. The method of claim 16, wherein the at least one power status indicator provides a visual feedback, an audio feedback, and/or a tactile feedback.

* * * * *